(12) United States Patent
Nireki et al.

(10) Patent No.: US 7,038,411 B2
(45) Date of Patent: May 2, 2006

(54) MOTOR STOP CONTROL DEVICE UTILIZABLE FOR REEL-TYPE GAMING MACHINE

(75) Inventors: Takao Nireki, Tokyo (JP); Shingo Omomo, Tokyo (JP); Yuuichirou Suzuki, Tokyo (JP)

(73) Assignee: Aruze Corp., Tokyo (JP)

( * ) Notice: Subject to any disclaimer, the term of this patent is extended or adjusted under 35 U.S.C. 154(b) by 0 days.

(21) Appl. No.: 10/834,182

(22) Filed: Apr. 29, 2004

(65) Prior Publication Data

US 2004/0224752 A1 Nov. 11, 2004

(30) Foreign Application Priority Data

May 9, 2003 (JP) .............................. 2003-131411

(51) Int. Cl.
*H02P 3/00* (2006.01)
*A63F 5/00* (2006.01)

(52) U.S. Cl. ..................... 318/370; 463/16; 463/20; 273/142 R; 273/143 R

(58) Field of Classification Search ................ 318/445, 318/362–382; 273/142 R, 143, 138.1, 142 H, 273/143 R; 463/20, 16
See application file for complete search history.

(56) References Cited

U.S. PATENT DOCUMENTS

| | | | | |
|---|---|---|---|---|
| 4,625,931 A | * | 12/1986 | Tamura et al. ........... | 242/423.1 |
| 4,711,452 A | * | 12/1987 | Dickinson et al. ...... | 273/143 R |
| 4,772,022 A | | 9/1988 | Yoshitomi | |
| 4,831,477 A | | 5/1989 | Sakamoto | |
| 5,609,524 A | | 3/1997 | Inoue | |
| 2004/0018869 A1 | * | 1/2004 | Inoue ...................... | 463/20 |

FOREIGN PATENT DOCUMENTS

| | | |
|---|---|---|
| EP | 0 317 146 A2 | 5/1989 |
| EP | 0 380 928 A2 | 8/1990 |
| GB | 546288 | 7/1942 |
| GB | 1 471 866 | 4/1977 |
| GB | 2 059 520 A | 4/1981 |
| GB | 2 150 335 A | 6/1985 |
| JP | 09-327553 | 12/1997 |
| JP | 09327553 A * | 12/1997 |
| JP | 10-071240 A1 | 3/1998 |
| JP | 2002-159627 | 6/2002 |
| JP | 2003-117076 | 4/2003 |
| JP | 2003117076 A * | 4/2003 |

* cited by examiner

*Primary Examiner*—David Martin
*Assistant Examiner*—Patrick Miller
(74) *Attorney, Agent, or Firm*—Rader, Fishman & Grauer PLLC

(57) ABSTRACT

In the motor stop control device utilizable for the reel-type gaming machine 1, there are provided the stepping motor 70 having two pairs of excitation phases for rotating the reel 3 on the outer periphery of which a plurality of symbols are formed, the speed reduction mechanism 700 for transmitting rotation of the stepping motor 70 to the rotation shaft of the reel 3 with a predetermined speed reduction ratio and the main CPU 40 for conducting speed reduction treatment to reduce rotation speed of the stepping motor 70 and excitation treatment by 2-phase excitation against the stepping motor 70 when the motor stop command occurs.

11 Claims, 21 Drawing Sheets

FIG.8

《REEL STOP TREATMENT》

| | STOP TREATMENT | | HOLDING TREATMENT | |
|---|---|---|---|---|
| | SYMBOL TREATMENT | SPEED REDUCTION TREATMENT | EXCITATION TREATMENT | VIBRATION RESTRAINING TREATMENT BY VIBRATION RESTRAINING MEMBER |
| GENERAL REEL STOP TREATMENT | ○ | × | ALL-PHASE ON | × |
| FIRST REEL STOP TREATMENT | ○ | ○ | 2-PHASE ON | × |
| SECOND REEL STOP TREATMENT | ○ | × | 2-PHASE ON | ○ |
| THIRD REEL STOP TREATMENT | ○ | ○ | 2-PHASE ON | ○ |

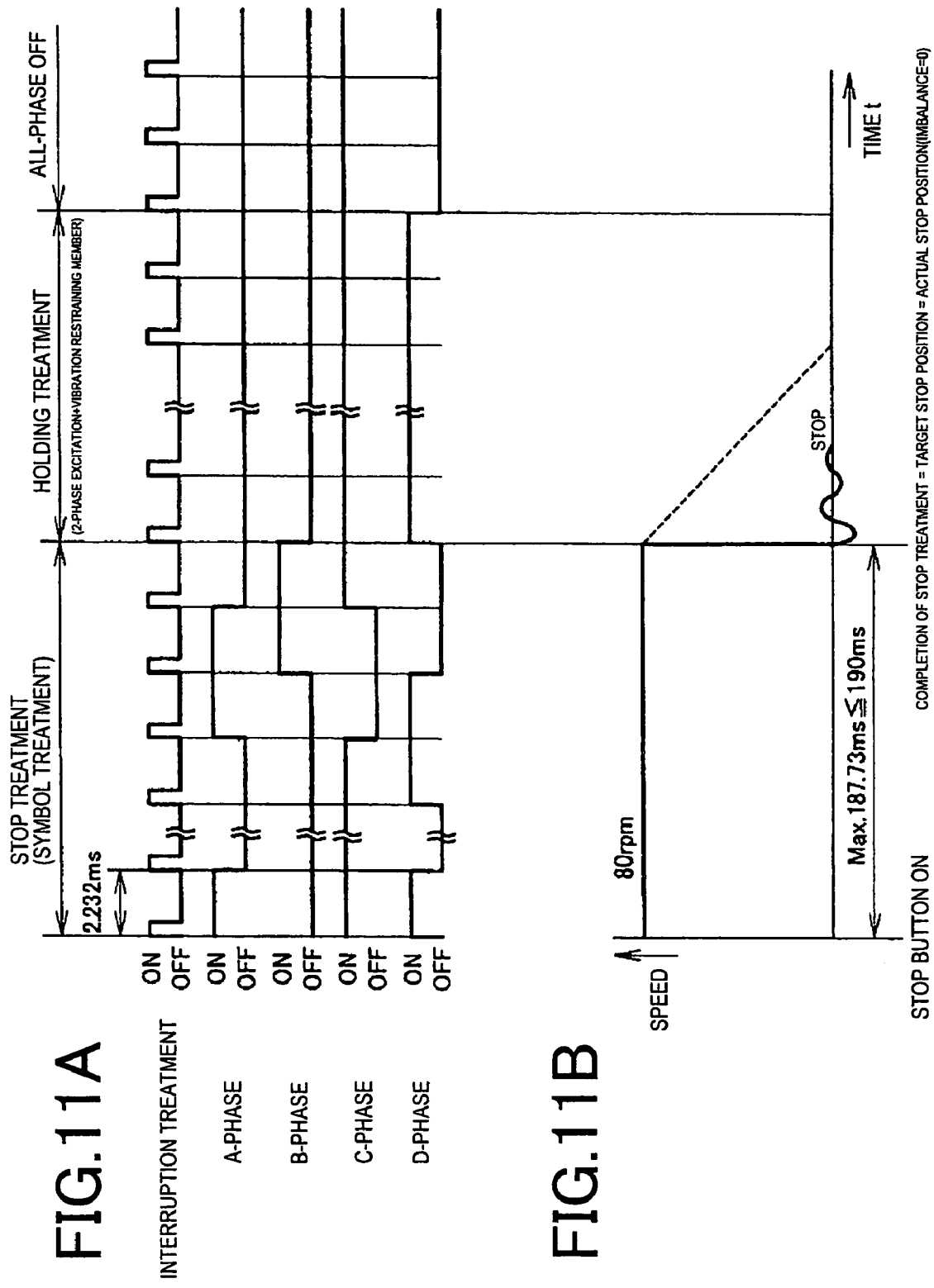

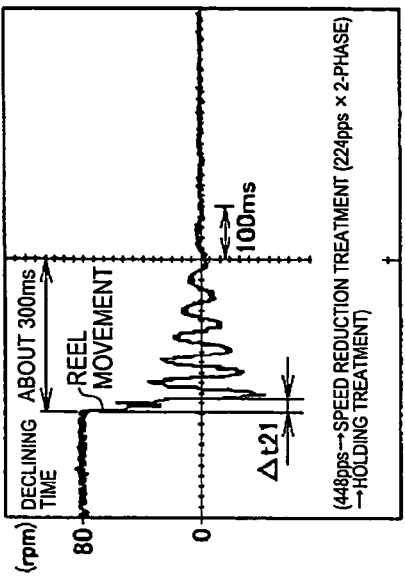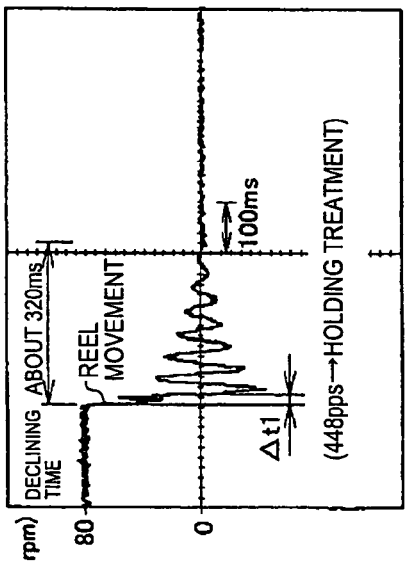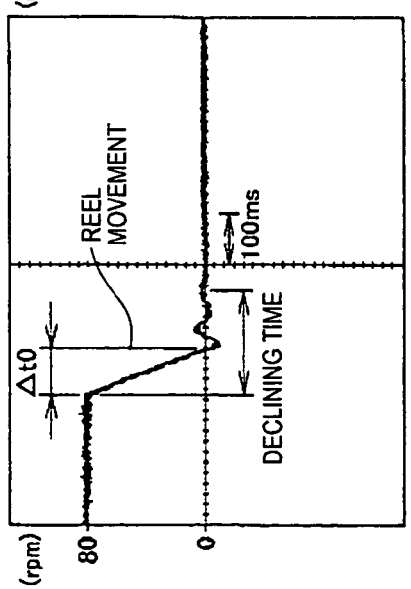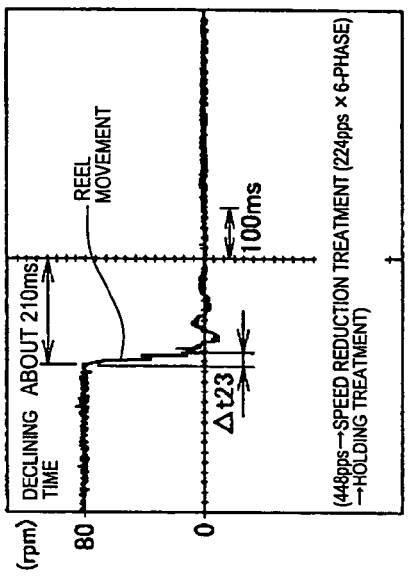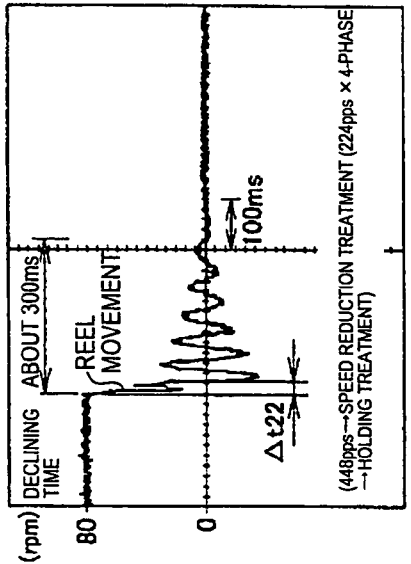

751

752

MOTOR STOP CONTROL DEVICE UTILIZABLE FOR REEL-TYPE GAMING MACHINE

CROSS-REFERENCE TO THE RELATED APPLICATION(S)

This application is based upon and claims a priority from the prior Japanese Patent Application No. 2003-131411 filed on May 9, 2003, the entire contents of which are incorporated herein by reference.

BACKGROUND OF THE INVENTION

1. Field of the Invention

The present invention relates to a motor stop control device for a reel-type gaming machine, the motor stop control device having a motor with two pairs of excitation phases and stopping the motor according to an instruction command transmitted from an external.

2. Description of Related Art

Conventionally, in a symbol variable rotation device utilized in a reel-type gaming machine (for example, a Japanese Pachi-slot machine), a reel is directly connected to a rotor of a stepping motor (abbreviated as "direct drive manner") as shown in Japanese Unexamined Publication No. 10-71240.

However, in the above direct drive manner, since it is not provided a mechanical speed reduction device the stepping motor has to produce rotation torque corresponding to inertia of the reel. Therefore, it is adopted an expensive stepping motor (for example, hybrid-type stepping motor), which can produce high torque. Thus, there is a problem that production cost of the reel unit including the stepping motor cannot be remarkably reduced.

Further, in reel control in the above direct drive manner, the stepping motor is controlled and stopped according to all-phase excitation, and it is generally used a manner in which detent torque in the stepping motor is utilized. However, there is imbalance in the detent torque every reel and is also imbalance in the above inertia every reel. Therefore, stop of symbol on the reel becomes unstable, as a result, the symbol described on the surface of the reel cannot be precisely stopped.

Further, in order to avoid imbalance in the symbol stop position, an assembler must conduct select work to make imbalance of the detent torque in the stepping motor narrow and adjust a balance (balance adjustment) between the detent torque and the inertia of the reel (moment of inertia) by spots. In this case, there is a problem that manday increases when the assembler assembles the reel unit.

SUMMARY OF THE INVENTION

The present invention has done taking the above situation into consideration and the object of the present invention is to provide a motor stop control device through which the reel unit can be assembled with less manday while reducing a motor cost and the reel can be precisely stopped without losing smoothness in motor braking.

In order to accomplish the above object, according to one aspect of the present invention, it can be provided a motor stop control device utilizable for a reel-type gaming machine comprising:

a motor having two pairs of excitation phases for rotating a reel on an outer periphery of which a plurality of symbols are formed, the motor being stopped corresponding to a motor stop command from an external;

a speed reduction mechanism for transmitting rotation of the motor to a rotation shaft of the reel with a predetermined speed reduction ratio; and a motor stop controller for conducting speed reduction treatment to reduce rotation speed of the motor and excitation treatment by 2-phase excitation against the motor when the motor stop command occurs.

According to the motor stop control device of the present invention, the speed reduction mechanism transmits rotation of the motor to the rotation shaft of the reel with a predetermined speed reduction ratio, therefore it can be adopted the motor (for example, PM type motor) which has small rotation torque and is very inexpensive. And the motor stop controller conducts the speed reduction treatment to reduce rotation speed of the motor, thereafter conducts the excitation treatment by 2-phase excitation against the motor. Therefore, the motor stop controller can precisely stop the reel at an exact position.

Further, since the motor stop controller executes the speed reduction treatment to reduce rotation speed of the motor, the motor stop controller can stop the reel at the exact position while retaining smoothness in braking of the motor, in comparison with a case that rotation speed of the motor is rapidly reduced. As a result, since braking control does not depend on the detent torque occurring when the reel is stopped, the above balance adjustment is not needed when the motor stop control device is produced and an assembler can assemble the reel unit with less manday.

Further, according to another aspect of the present invention, it can be provided a motor stop control device utilizable for a reel-type gaming machine comprising:

a motor having two pairs of excitation phases for rotating a reel on an outer periphery of which a plurality of symbols are formed, the motor being stopped corresponding to a motor stop command from an external;

a speed reduction mechanism for transmitting rotation of the motor to a rotation shaft of the reel with a predetermined speed reduction ratio;

a motor stop controller for conducting excitation treatment by 2-phase excitation against the motor when the motor stop command occurs; and a vibration restraining member for declining vibration occurring when rotation of the reel is stopped, when the excitation treatment is conducted by the motor stop controller.

According to the motor stop control device of the present invention, the speed reduction mechanism transmits rotation of the motor to the rotation shaft of the reel with a predetermined speed reduction ratio, therefore it can be adopted the motor which has small rotation torque and is very inexpensive. And the motor stop controller conducts the speed reduction treatment to reduce rotation speed of the motor, thereafter conducts the excitation treatment by 2-phase excitation against the motor. Therefore, the motor stop controller can precisely stop the reel at an exact position.

Further, since the vibration restraining member has braking function to brake rotation of the reel and declines vibration occurring when rotation of the reel is stopped, the vibration restraining member can stop the reel at the exact position while retaining smoothness in braking of the motor. As a result, the above balance adjustment is not needed when the motor stop control device is produced and an assembler can assemble the reel unit with less manday.

As mentioned above, according to the present invention, cost of the motor can be reduced and the reel unit can be produced with less manday, further the reel can be precisely stopped at the exact position while retaining smoothness in braking of the motor.

The above and further objects and novel features of the invention will more fully appear from the following detailed description when the same is read in connection with the accompanying drawings. It is to be expressly understood, however, that the drawings are for purpose of illustration only and not intended as a definition of the limits of the invention.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention.

In the drawings,

FIG. 8 is a table showing contents of reel stop treatment, in the embodiment, FIGS. 11A and 11B are explanatory views showing contents of "second reel stop treatment", in the embodiment, FIGS. 13A, 13B, 13G, 13D, and 13E are explanatory views showing wave forms of reel rotation speed measured in various reel stop treatments, in the embodiment.

DETAILED DESCRIPTION OF THE PREFERRED EMBODIMENTS (Basic Construction of Motor Stop Control Device)

Figure 1:
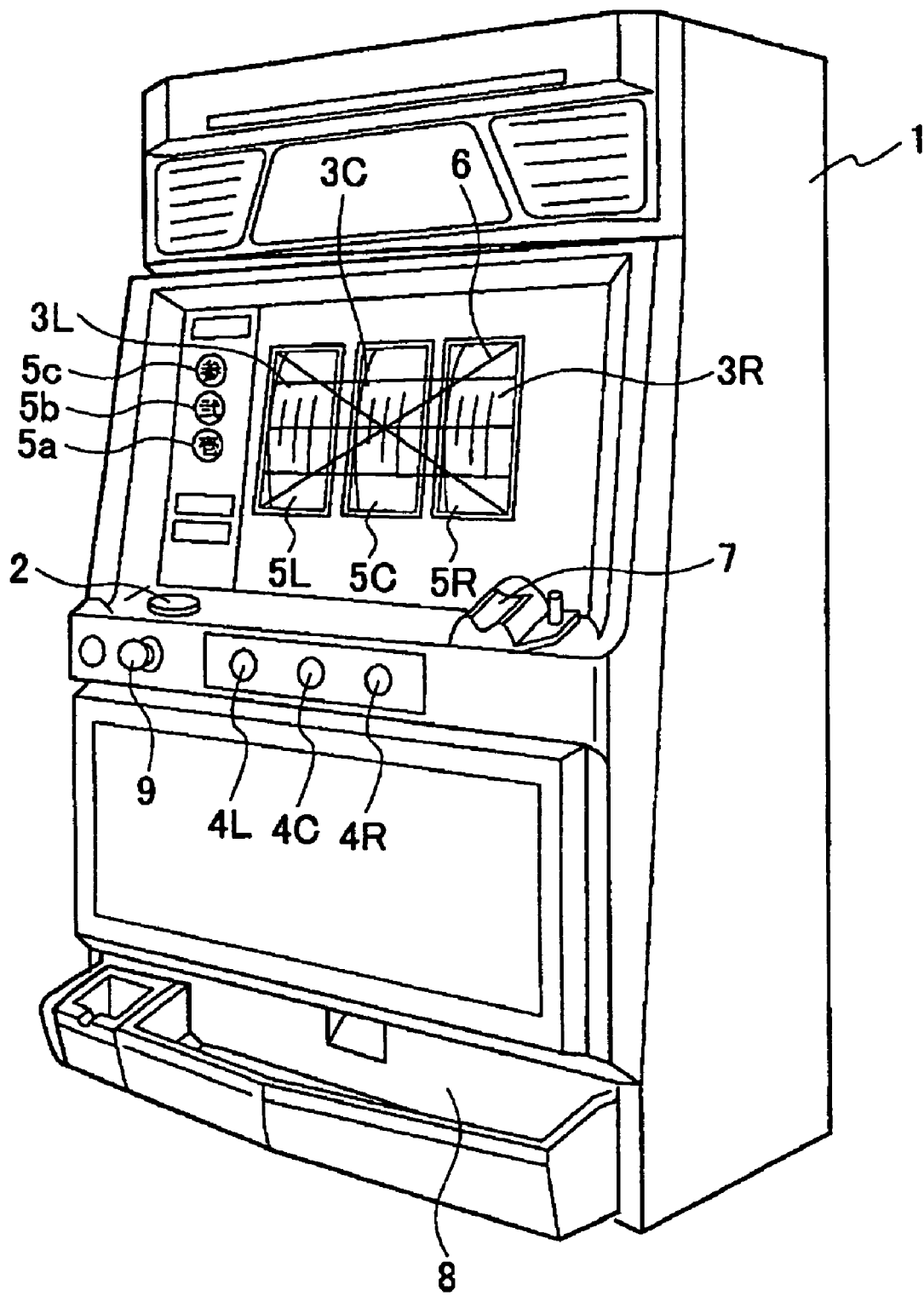
FIG. 1 is a perspective view of a gaming machine according to the embodiment.

The motor stop control device of the embodiment will be described with reference to the drawings. FIG. 1 is a perspective view of a reel-type gaming machine according to the embodiment.

As shown in FIG. 1, in front of a cabinet forming a whole construction of the reel-type gaming machine 1, three panel display windows 5L, 5C, 5R are formed. Reels 3L, 3C, 3R constructing a reel unit are seen and recognized through the panel display windows 5L, 5C, 5R, respectively. And on the panel display windows 5L, 5C, 5R, three pay lines 6 are described along three horizontal directions and two pay lines 6 are described along two oblique directions. These pay lines 6 are made effective according to the number of coins inserted through an insertion slot 7 and the number of pay lines 6 are determined.

Each of the reels 3L, 3C, 3R starts to rotate when a player inserts coins in the insertion slot 7 and operates a start lever 9. And when the player presses stop buttons 4L, 4C, 4R arranged corresponding to the reels 3L, 3C, 3R respectively, rotation of the reels 3L, 3C, 3R is stopped. Further, based on symbol combination of each of reels 3L, 3C, 3R which are seen and recognized through each of the panel display windows 5L, 5C, 5R when rotation of the reels 3L, 3C, 3R is stopped, winning mode is determined. And when winning is obtained, coins the number of which corresponds to the winning mode are paid out to a coin tray 8.

Figure 2:
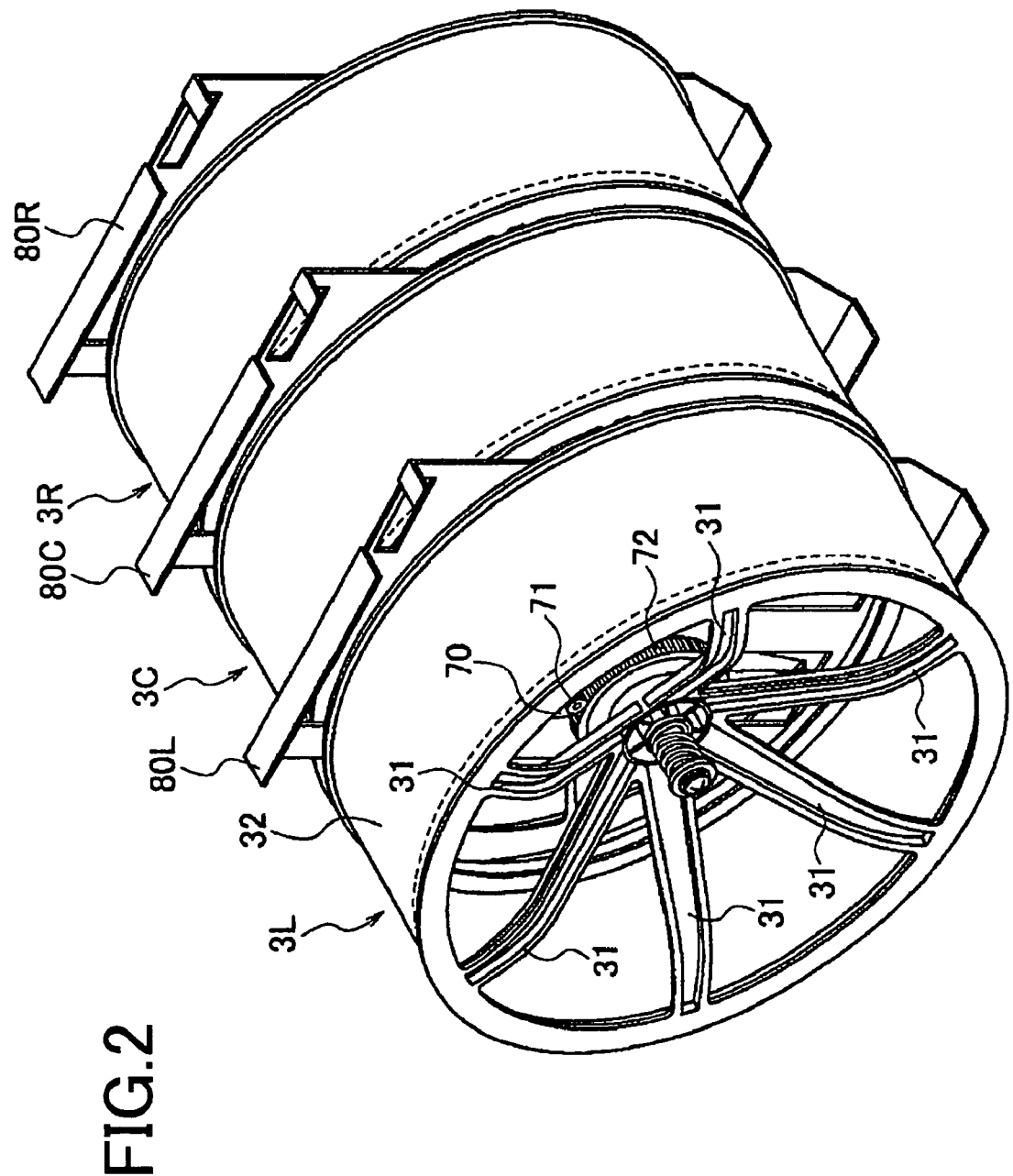
FIG. 2 is a perspective view showing a construction of reels when obliquely seeing the reels in the embodiment.

FIG. 2 is a perspective view showing the construction of the reel unit arranged within the panel display windows 5L, 5C, 5R. As shown in FIG. 2, the reel unit has three support plates 80L, 80C, 80R, three reels 3L, 3C, 3R arranged inside of each support plate 80L, 80C, 80R, respectively, and three stepping motors 70L, 70C, 70R of PM type rotating the reels 3L, 3C, 3R, respectively.

Hereinafter, for convenience sake of explanation, although description will be done to limit to the left reel 3L (reel 3), the left support plate 80L (support plate 80), the left stepping motor 70L (stepping motor 70), among three reels 3L, 3C, 3R, three support plates 80L, 80C, 80R, three stepping motors 70L, 70, 70R, the other reels 3C, 3R, the other support plates 80C, 80R, the other stepping motors 70C, 70R have the same construction as those of the reel 3L, the support plate 80L, the stepping motor 70L, so long as explanation is not especially referred.

Figure 3:
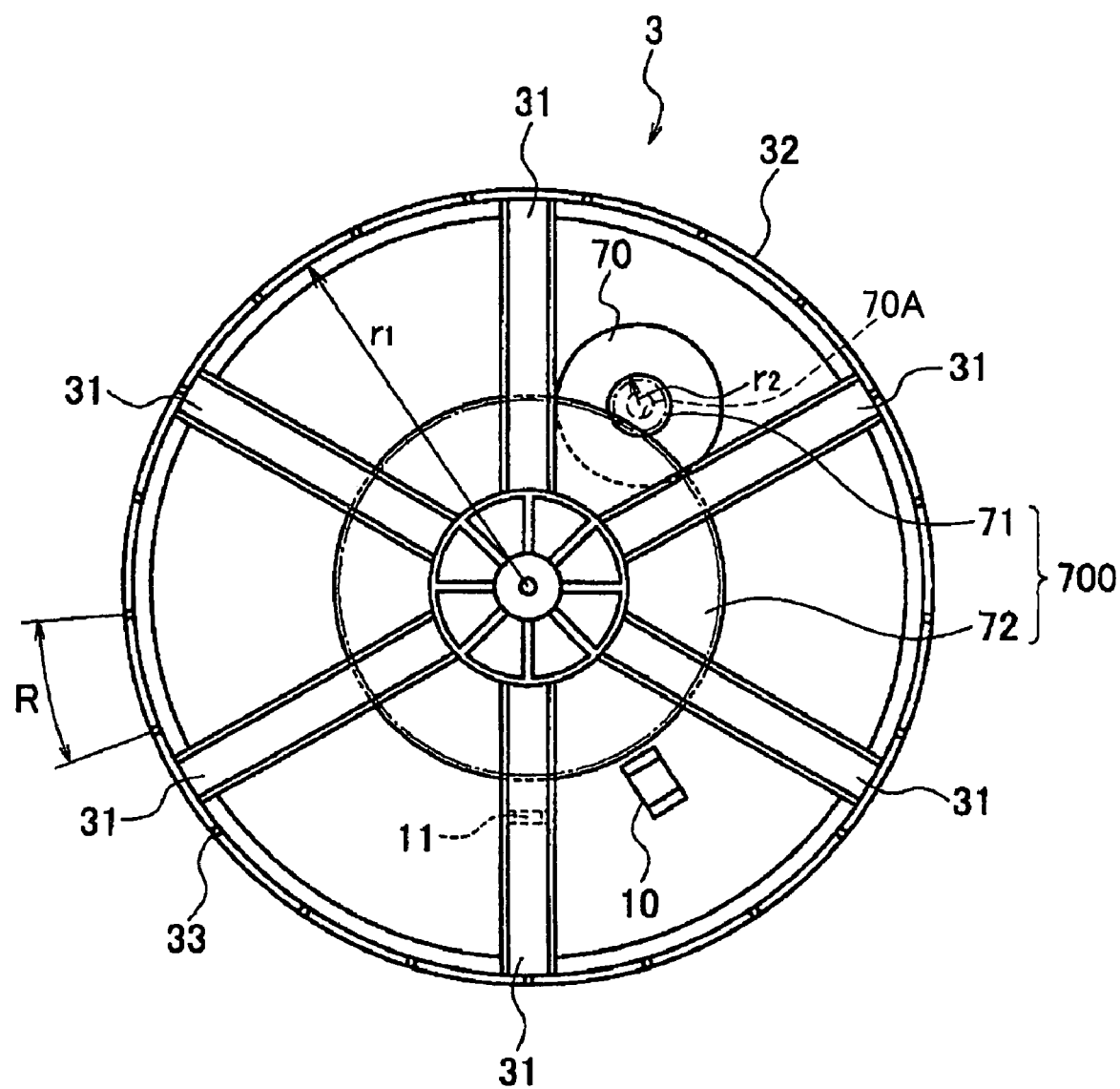
FIG. 3 is s side view of the reel in the embodiment.

FIG. 3 is the left side view of the reel 3. As shown in FIG. 3, on the support plate 80 (not shown), it is arranged a position detecting sensor 10 for detecting the rotation position of the reel 3 and functioning as the reel position detecting circuit, within the rotation radius r1 of the reel 3. The reel 3 is rotatably supported to a reel post 76 which corresponds to the center of the reel 3 and is extended normally to the plane of the support plate 80.

As shown in FIG. 3, the reel 3 is constructed from six arms 31 extending spokewise from the center of the reel 3 and a cylindrical member 32 integrally formed so that top ends of the arms 31 are connected thereto. To one of the arms 31, it is provided a detection member 11 at a position where the position detecting sensor 10 can detect, the detection member 11 functioning as the standard position. The detection member 11 is positioned so as to pass the position detecting sensor 10 every the reel 3 rotates by one rotation. Further, the position detecting sensor 10 is formed so as to be able to output a detection signal every detection of the detection member 11 when the detection member 11 passes therethrough.

On an outer periphery of the cylindrical member 32, symbol marks 33 are printed with a predetermined pitch, total number of the symbol mark 33 being 21 in the embodiment. And a symbol sheet (not shown) is adhered on the outer periphery of the cylindrical member 32. This symbol sheet is set to the outer periphery of the cylindrical member 32 by a method such as adhesion so that center of the symbol printed on the symbol sheet is positioned at the symbol mark 33.

A speed reduction transmission mechanism 700 is arranged between a drive shaft 70A of the stepping motor 70 and a rotation shaft of the reel 3, as shown in FIG. 3. This speed reduction transmission mechanism 700 transmits rotation of the stepping motor 70 to the rotation shaft of the reel 3 with a predetermined reduction ratio.

As shown in FIG. 3, the speed reduction transmission mechanism 700 has two gears, one of which is an output gear 71 put on the drive shaft 70A of the stepping motor 70 and the other is an input gear 72 meshing with the output gear 71 and being arranged in the reel 3 so that the rotation center of the input gear becomes the same shaft center as the rotation shaft of the reel 3.

As the output gear 71 and the input gear 72, spur gears are, for example, utilized. The tooth number of the input gear 72 in the embodiment is set to the tooth number obtained by multiplying the tooth number of the output gear 71 by 7. Therefore, the speed reduction transmission mechanism 700 is constructed so as to transmit rotation of the stepping motor 70 to the reel 3 while reducing rotation number of the stepping motor 70 to ⅐ thereof.

The reduction ratio of the above output gear 71 and the input gear 72 is obtained based on the ratio of the step number necessary for one rotation of the stepping motor 70 and the least common multiple calculated from the symbol number described on the reel 3 and the step number for one rotation of the stepping motor 70.

Concretely, for example, in a case that the step number for one rotation of the stepping motor 70 is "48" and the symbol number described on the reel 3 is "21", the least common multiple of "48" and "21" is "336". And the ratio of the step number "48" for one rotation of the stepping motor 70 and the least common multiple "336" becomes "48: 336=1:7." Therefore, the ratio of tooth number between the output gear 71 and the input gear 72 is obtained as "1:7×n (n is integer)".

Further, in a case that the rotation speed of the reel 3 is 80 rpm and the gear ratio is 1:7 (the above n is 7), the rotation speed of the stepping motor 70 becomes 1.33 rps. Thus, if the step number for one rotation of the stepping motor 70 is 48, the drive frequency of the stepping motor 70 becomes 448 pps (1.33 rps×"336").

The above drive frequency lies within a proper range of drive frequency (about 300~500 pps) of the stepping motor 70 when 2-phase excitation is conducted. And if the above integer n is more than 2, the drive frequency of the stepping motor 70 becomes more than 896 pps based on the same calculation mentioned, thus the drive frequency of the stepping motor 70 becomes out of the proper range thereof.

As mentioned, the combination in which the integer n is 1 (rotation speed 80 rpm, gear ratio 1:7, step number 48) becomes the most proper condition. That is to say, the proper reduction ratio is uniformly determined based on the combination of "the least common multiple calculated from the step number for one rotation of the stepping motor 70 and symbol number" and "the drive frequency of the stepping motor 70".

Figure 4:
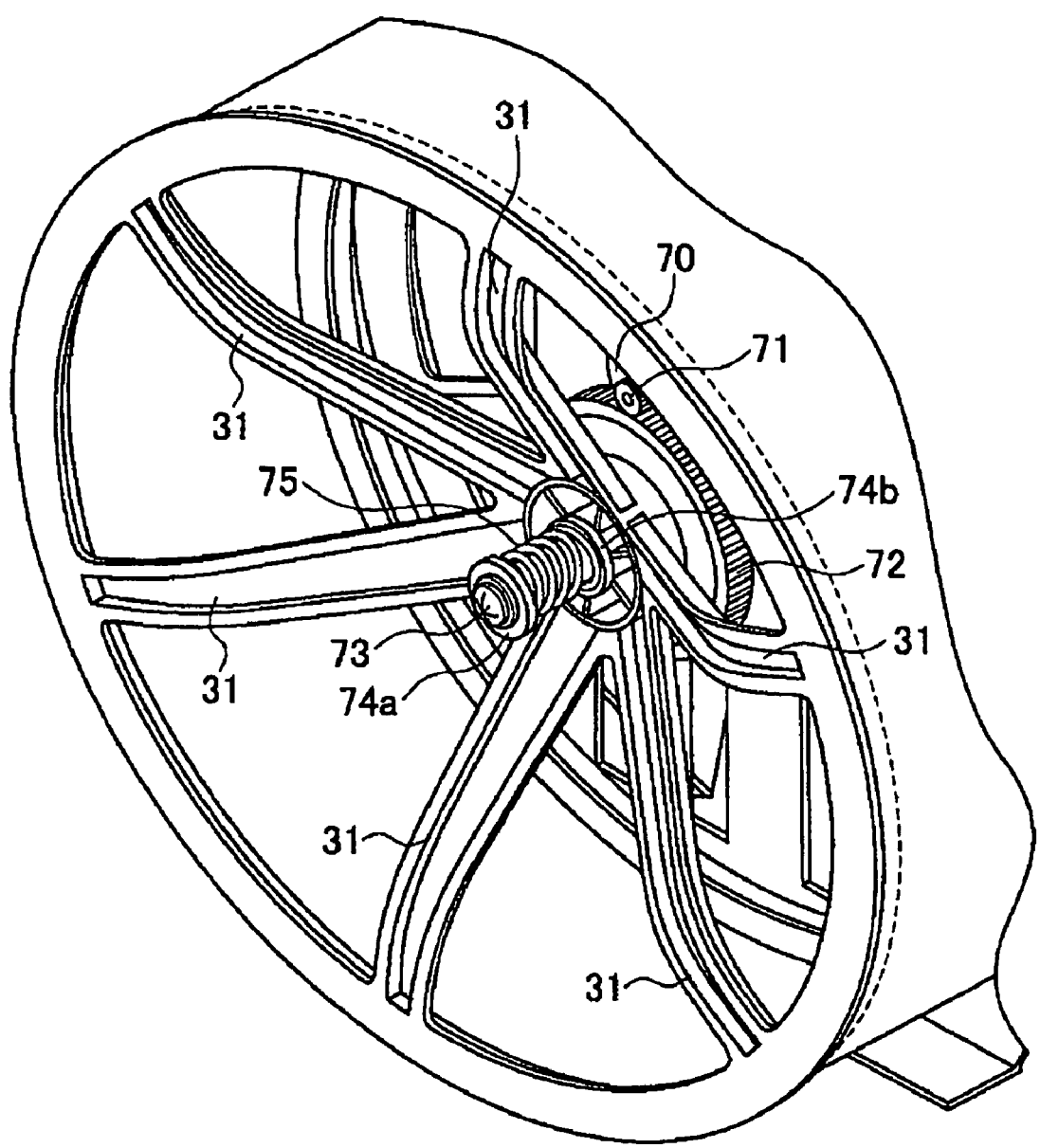
FIG. 4 is an explanatory view showing a construction near a central shaft of the reel in the embodiment.
Figure 5A:
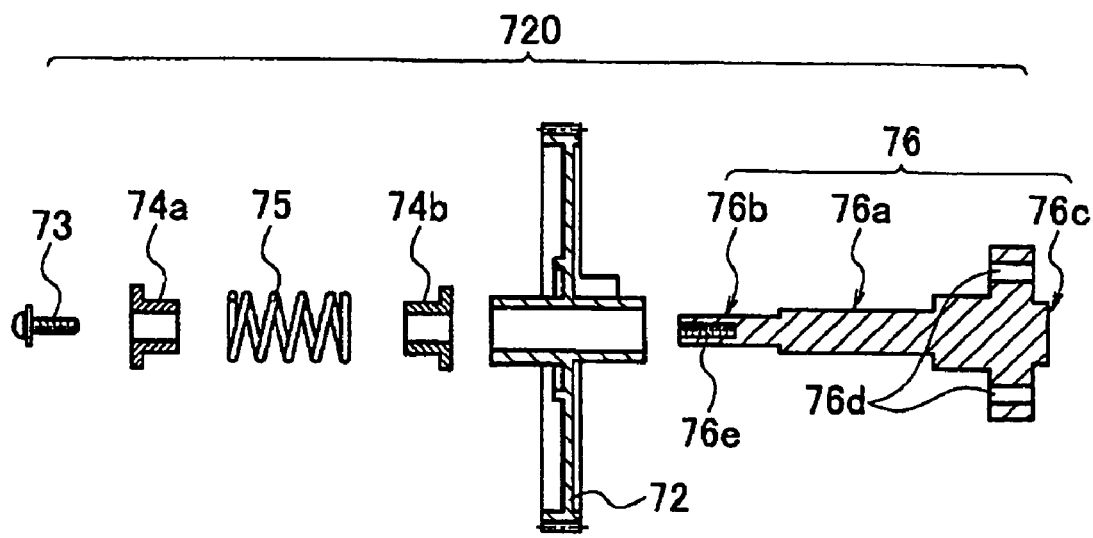
FIGS. 5A and 5B are explanatory views showing a shaft support portion of the reel in the embodiment.
Figure 5B:
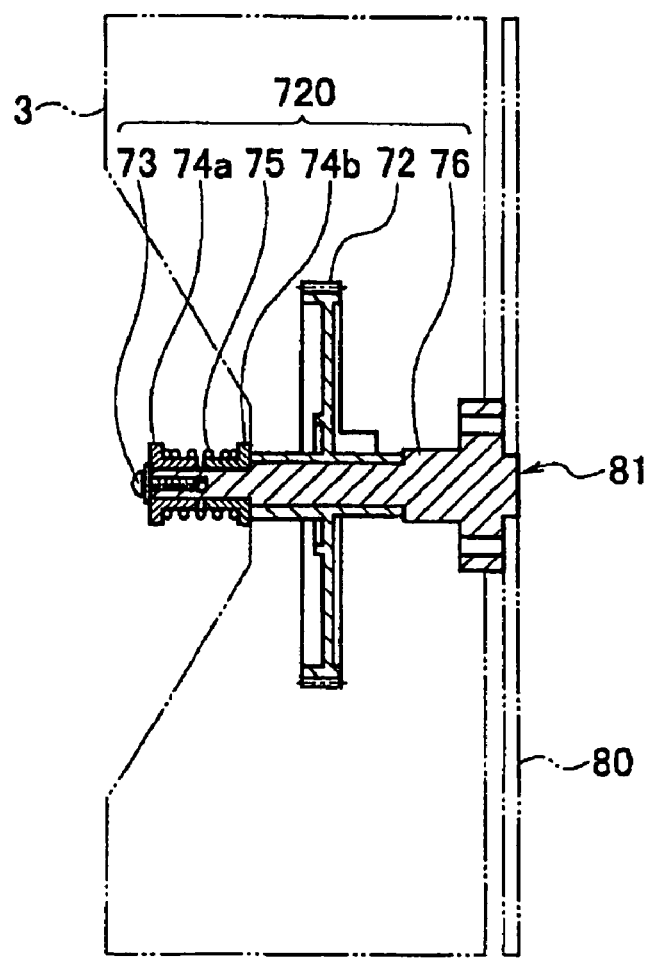
Figure 6:
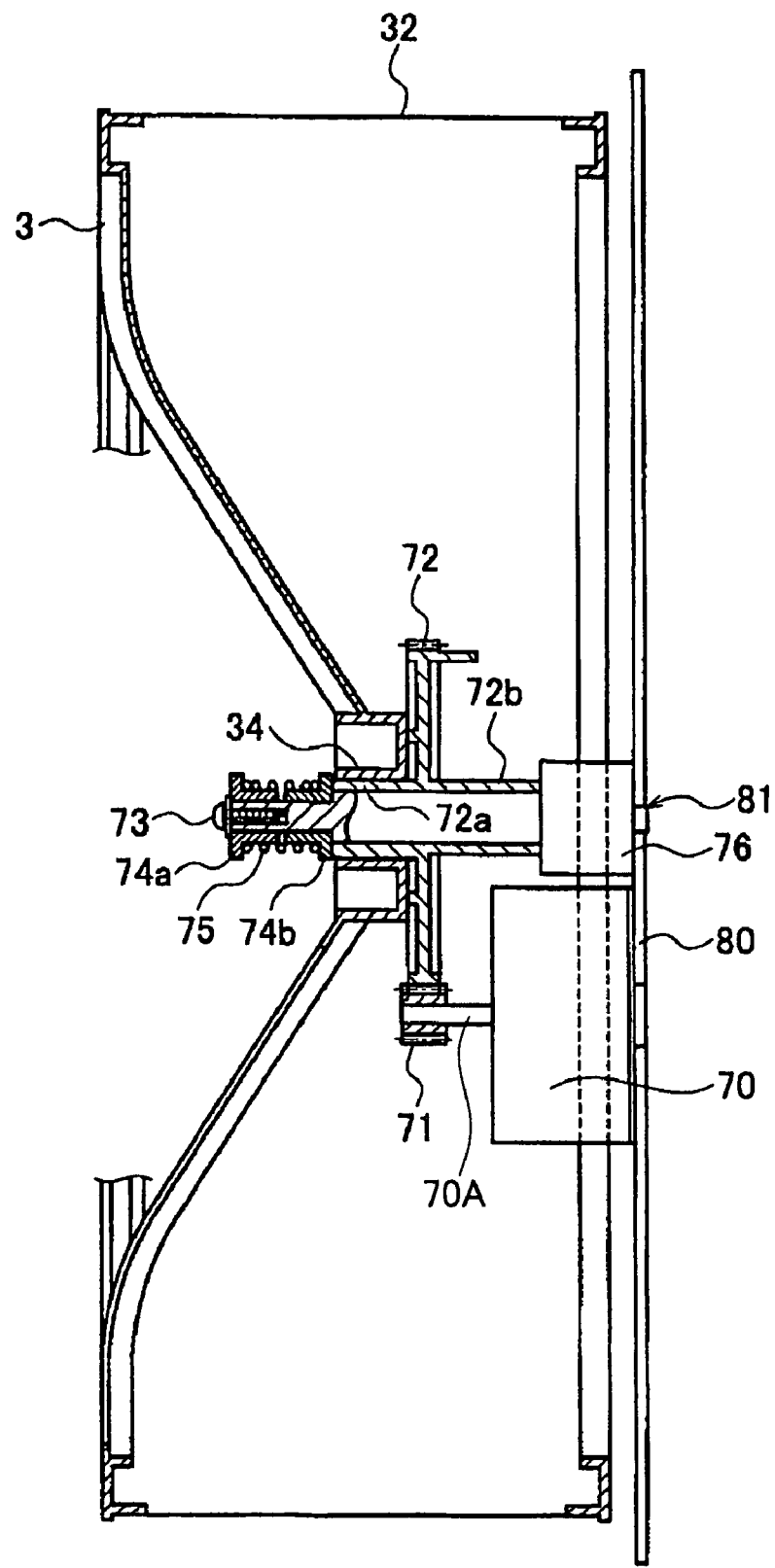
FIG. 6 is a sectional view showing a construction in which the shaft support portion is arranged on a support plate, in the embodiment.

FIG. 4 is a perspective view indicating a periphery part of the rotation shaft of the reel 3. FIG. 5A is an explanatory view indicating a construction of the shaft support part 720 for rotatably supporting the reel 3. FIG. 5B is an explanatory view indicating a construction for supporting the reel 3 by the shaft support part 720 arranged on the support plate 80. And FIG. 6 is a sectional view indicating a whole construction for supporting the reel 3 by the shaft support part 720.

As shown in FIG. 5A, the shaft support part 720 is has a stopper screw 73, colors 74a, 74b, a vibration restraining member 75 and a reel post 76. The reel post 76 is provided with a rotation support portion 76a to which the input gear 72 is inserted and rotatably supported, a position fixing portion 76b to which a member for fixing the position of the reel 3 is inserted, a projection portion 76c which projected toward the support plate 80 from the bottom plane of the reel post 76 and is utilized for inserting the reel post 76 in a hole 81 formed in the support plate 80, screw holes 76d for fixing the reel post 76 to the support plate 80 by screws and a screw hole 76e in which the stopper screw 73 is fastened while the input gear 72 is inserted to the rotation support portion 76a and the colors 74a, 74b are inserted to the position fixing portion 76b while existing the vibration restraining member 75 therebetween, thereby the input gear 72 is prevented from coming off from the reel post 76.

The vibration restraining member 75 has function to brake rotation of the reel 3 when the reel 3 is rotating, based on stop control by the CPU 40, and to decline vibration of the reel 3 occurring when rotation of the reel 3 is stopped. As the vibration restraining member 75, springs can be utilized. In the embodiment, description will be done according that the spring 75 shown in FIG. 5A is used as the vibration restraining member. As shown in FIG. 5B, the input gear 72 is inserted to the rotation support portion 76a, the spring 75 is inserted to the position fixing portion 76b while being sandwiched between the colors 74a and 74b.

The above mentioned stopper screw 73 is, as shown in FIG. 5B, inserted and fastened to the screw hole 76e, thereby the colors 64a, 74b and the spring 75 inserted to the position fixing portion 76b are prevented from coming off therefrom. The spring 75, which is prevented from coming off by the stopper screw 73, presses the input gear 72 toward the support plate 80 through the color 74b by its resilient force. At that time, frictional force occurs between the input gear 72 and the support plate 80, thereby the spring 75 can decline vibration of the reel 3 occurring when the reel 3 is stopped.

As shown in FIG. 6, in the input gear 72, two cylindrical projection portions 72a and 72b are integrally formed from both sides of the plate portion. Both the cylindrical projection portions 72a, 72b are perpendicularly projected from both sides of the plate portion, thereby the rotation support portion 76a can be inserted through the cylindrical projection portions 72a, 72b along an axis passing through the center of the cylindrical projection portions 72a, 72b. The input gear 72 is inserted to the rotation support portion 76a so that one cylindrical projection portion 72b faces to the support plate 80. The other cylindrical projection portion 72a is pressed into the hole 34 formed at the center position of the reel 3. Therefore, when the output gear 71 is rotated, the input gear 72 and the reel 3 are rotated all together around the rotation support portion 76a.

Figure 7:
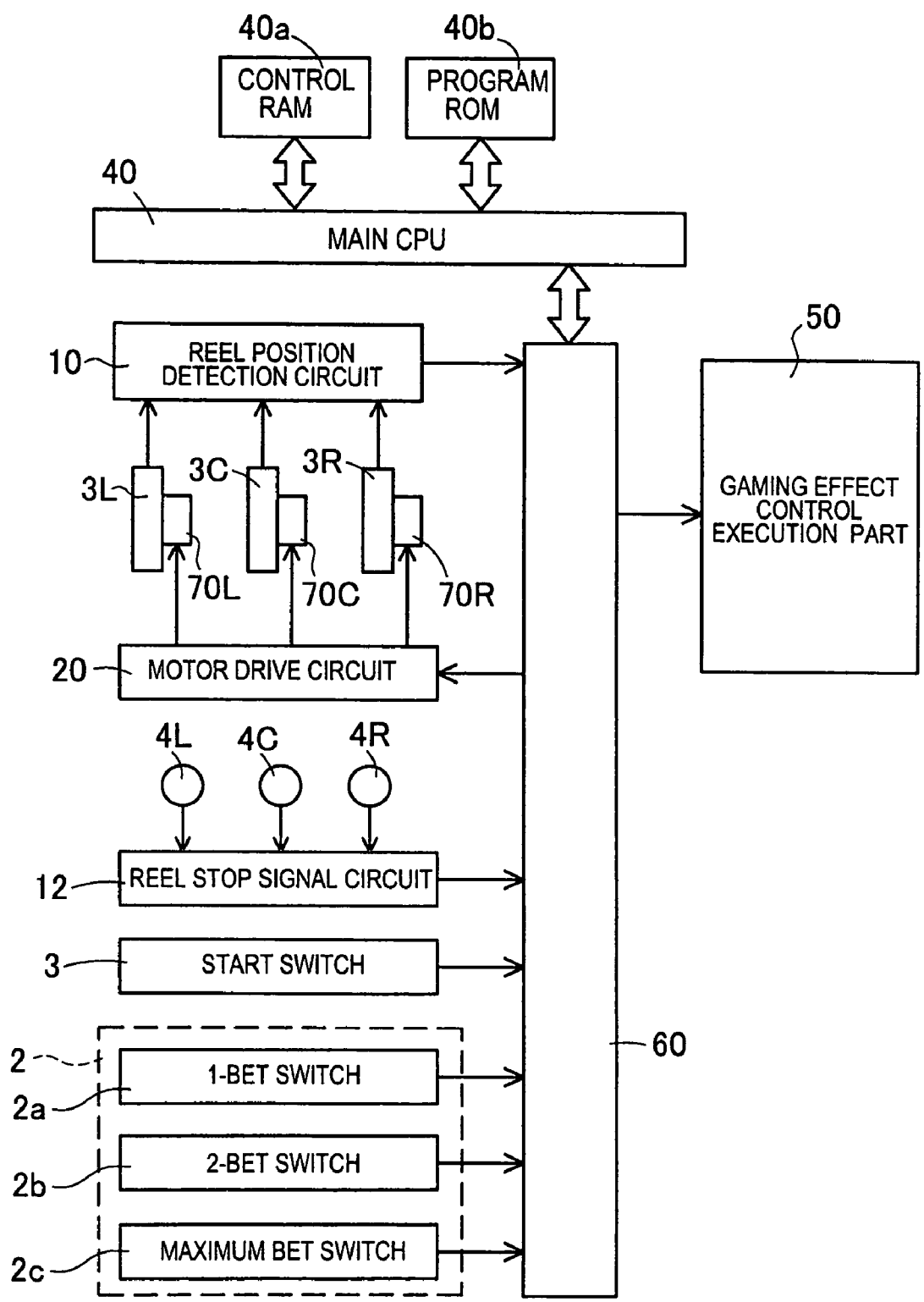
FIG. 7 is a block diagram of the gaming machine in the embodiment.

FIG. 7 is a block diagram indicating an electrical construction of the reel-type gaming machine 1, including the motor stop control device. The motor stop control device is provided with the stepping motor 70 with two pairs of excitation phases, as the drive source of the reel 3 having a plurality of symbols, and stops the stepping motor 70 corresponding to an instruction command transmitted from an external.

As shown in FIG. 7, in a microcomputer, there are provided a main CPU 40 functioning as a main controller for mainly controlling and calculating, a program ROM 40b for storing programs and various data, a control RAM 40a utilized for data reading and writing, and a random number generator (not shown) for generating predetermined random number values.

Input parts such as a start switch 3 for detecting operation of the start lever 9, a reel stop signal circuit 12 for detecting operation of the stop buttons 4L, 4C, 4R, an input part 2 including BET switches 2a~2c for betting credited coins by pressing thereof and output parts such as a motor drive circuit 20, coin payout part (not shown) and gaming effect control execution part 50, are connected to the main CPU 40.

The main CPU 40 reads and writes data to the control RAM 40a according to programs stored in the program ROM 40b, and serially controls operation of each of the input parts and conducts lottery treatment by using the random number value generated by the random number generator. The gaming effect control execution part 50 executes effects corresponding to the lottery treatment, based on commands from the main CPU 40.

The main CPU 40 executes internal lottery treatment after detecting operation of the start lever 9. Here, the main CPU 40 samples the predetermined random number value generated by the random number generator and determines whether the sampled random number value lies within a predetermined range or not. According to this, lottery treatment is conducted. Here, this lottery treatment is well-known, therefore explanation thereof will be omitted.

Thereafter, when stop operation of the stop buttons 4L, 4C, 4R is conducted and the lottery result is internally won, the main CPU 40 conducts stop control of the reels 3 so that the predetermined winning combination of the symbols is stopped along the pay line by drawing the predetermined symbols internally won in the pay line. On the other hand, when the lottery result is not internally won, the main CPU 40 conducts slide treatment of the symbols (this treatment is done by sliding the predetermined number of symbols) so that the timing of the stop operation of stop buttons 4L, 4C, 4R does not coincide with the predetermined winning combination, thereafter the main CPU 40 conducts stop control of the reels 3.

Here, the treatment including the above draw-in treatment that the main CPU 40 draws the symbols internally won in the pay line and the above slide treatment that the main CPU 40 slides the predetermined number of symbols so that such symbols do not form the predetermined winning combination, is abbreviated as "symbol treatment", hereinafter.

The motor drive circuit 20 drives or stops the stepping motor 70 based on commands from the main CPU 40. In the embodiment, this motor drive circuit 20 controls current running in the drive coil by chopping operation. The chopping operation means that ON/OFF switching of current is repeated with high-frequency. Thereby, the motor drive circuit 20 can efficiently conduct rotation control of the rotor in the stepping motor 70.

Here, the stepping motor 70 is 4-phase motor and has four drive coils through A-phase to D-phase. And in the embodiment, each phase is defined so as to stand in order A-phase, B-phase, C-phase and D-phase in anti-clockwise direction. Further, A-phase and C-phase or B-phase and D-phase forms one pair and current running in one phase in the one pair of two phases has the reverse phase different from current running in the other phase in the one pair.

The motor drive circuit 20 serially excites the drive coil in each phase based on commands from the main CPU 40, thereby the rotor in the stepping motor 70 is driven to rotate. When the stepping motor 70 is driven, the pulse with phase lag is provided to each bypolar or unipolar transistor existing in each phase of the motor drive circuit 20, from the main CPU 40.

As the drive manner of the stepping motor 70, there exist 1-phase excitation, 2-phase excitation and 1-2 phase excitation. In the embodiment, it is applied 2-phase excitation in which the drive coils in two phases are excited at the same time. This 2-phase excitation (for example, excitation of C-phase and D-phase) means that current runs in two excitation phases so that direction of magnetic field occurring in two excitation phases among two pairs of excitation phases becomes same with each other, in the embodiment. According to stop control by the 2-phase excitation (for example, excitation of C-phase and D-phase), it can be obtained strong braking force in comparison with that by all-phase excitation, 1-phase excitation, 3-phase excitation.

Further, as the stepping motor 70 in the embodiment, stepping motor of PM type is utilized, the stepping motor of PM type, for example, being driven by 4.8 steps per one rotation (in this case, the stepping motor has rotation angle of 7.5 degrees).

FIG. 8 is an explanatory view indicating contents of reel stop treatment which is done until the reel 3 is finally stopped. In this reel stop treatment, as shown in FIG. 8, there are included "stop treatment" indicating treatment conducted till "holding treatment" is started after any one of the stop buttons 4 is pressed, and "holding treatment" indicating treatment conducted till the reel 3 is fully stopped after the above "stop treatment" is finished.

The "stop treatment" shown in FIG. 8 includes the "symbol treatment", in which the draw-in treatment that the main CPU 40 draws the predetermined symbols internally won in the pay line or the "slide treatment" that the main CPU 40 slides the predetermined number of symbols so that the predetermined winning combination do not stop along the pay line is done till just before the reel 3 is stopped at the target stop position after the stop buttons 4 are pressed, and the "speed reduction treatment", in which the control treatment to reduce rotation speed of the stepping motor 70 when stopped is conducted till the reel 3 is stopped at the target stop position after the "symbol treatment" is finished. Here, 2-phase excitation (for example, excitation of B-phase and C-phase) is adopted in the "speed reduction treatment" in the embodiment.

The "holding treatment" includes "excitation treatment" indicating the treatment (stop treatment) in which each phase is excited to stop the stepping motor 70 and "vibration restraining treatment by the vibration restraining member 75" indicating the treatment in which vibration of the reel 3 occurring when rotation of the stepping motor 70 is stopped is declined.

In the reel stop treatment including the above mentioned "stop treatment" and the "holding treatment", as shown in FIG. 8, "general reel stop treatment", "first reel stop treatment", "second reel stop treatment" and "third reel stop treatment" are included. These reel stop treatments are serially described hereinafter.

① General Reel Stop Treatment

Figure 9A:
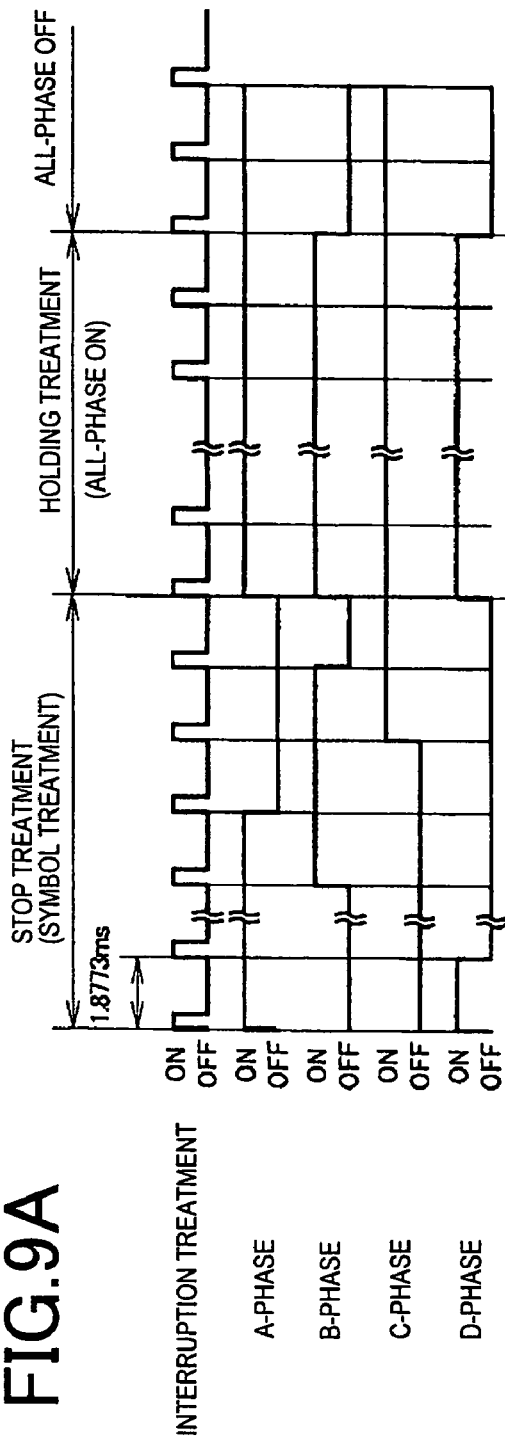
FIGS. 9A and 9B are explanatory views showing contents of "general reel stop treatment", in the embodiment.
Figure 9B:
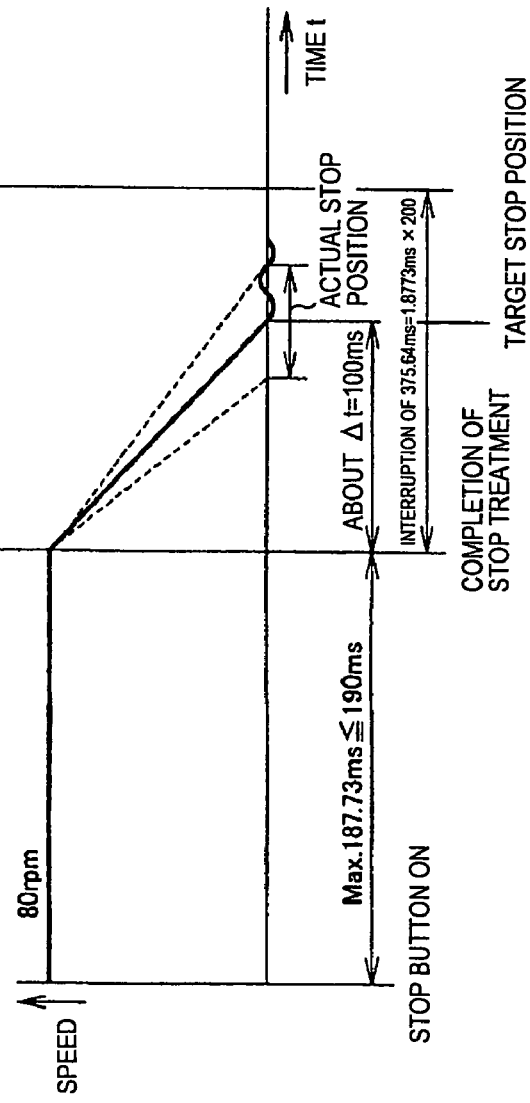

FIG. 9 A explanatory view indicating contents of the "general reel stop treatment". FIG. 9A is an explanatory view indicating pulses in each phase, the pulses being transmitted from the main CPU 40 to the motor drive circuit 20 during the "stop treatment" and the "holding treatment". FIG. 9B is an explanatory view indicating the rotation speed of the reel 3 against time when the motor drive circuit 20 drives the stepping motor 70 based on the pulses in each phase received from the main CPU 40. In the embodiment, the time indicated in FIG. 9B corresponds to the time indicated in FIG. 9A. The "general reel stop treatment" means the reel stop treatment which is conventionally conducted.

Here, the area indicated between two dot-lines in FIG. 9B indicates a range of imbalance in the actual stop position. The actual stop position is determined by the balance of the detent torque of the stepping motor 70 and the inertia of the reel 3. Thus, according to such balance, the actual stop position is changed. Here, since adjustment of such balance is artificially done by the assembler, product cost becomes very expensive. At this point, since the "speed reduction treatment", the "excitation treatment" or the "vibration restraining treatment by the vibration restraining member 75" is conducted in the "first reel stop treatment" to the "third reel stop treatment", imbalance in the actual stop position becomes substantially 0 (zero).

As shown in FIGS. 9A and 9B, in the "general reel stop treatment", the "symbol treatment" is done after the stop buttons 4 are pressed and the "excitation treatment" is done by all-phase excitation, thereafter the reel is stopped. And in the "general reel stop treatment", as shown in FIG. 8, the "speed reduction treatment" and the "vibration restraining treatment by the vibration restraining member 75", which are done in the "first reel stop treatment" to the "third reel stop treatment", are not conducted. Further, the "general reel stop treatment" is done in the drive mechanism in which the speed reduction mechanism 700 is not provided but, instead, the direct drive manner of the stepping motor 70 is adopted.

As shown in FIG. 9A, the interruption treatment in the "general reel stop treatment" is conducted, for example, every time interval of 1.8773 ms. Here, the time interval of the interruption treatment is determined by the relation of drive frequency of the stepping motor 70. The drive frequency S of the stepping motor 70 can be represented by the relation that S=(rotation number of the reel 3 for one second)×(step number of the stepping motor 70 per one rotation).

In a case that the (rotation number of the reel 3 for one second) in the embodiment is, for example, 80 rpm/60 sec, the (step number of the stepping motor 70 per one rotation) is, for example, 200 and 1-2 phase excitation manner is adopted as the excitation manner, the step number of the stepping motor 70 for one rotation becomes 400. Thereby, the drive frequency S of the stepping motor 70 becomes 533 pps according to the above relation.

Therefore, since the vibration frequency T is represented by 1/S, the vibration frequency becomes 1.875 ms. This vibration frequency T (1.875 ms) is a value (vibration frequency T>clock frequency) near the minimum clock frequency (for example, 1.2 ms) utilized in the main CPU 40, thus the interruption treatment is done by the time interval of 1.875 ms.

Further, as shown in FIGS. 9A and 9B, the maximum interruption number till the stop treatment is completed after the stop buttons 4 are pressed is obtained according to the relation mentioned hereinafter. Here, the symbol number described on the reel 3 is 21 and the step number of the stepping motor 70 for one rotation is 400. Therefore, the step number per one symbol does not become an integer such as 400 steps/21 symbols=19.05. Thus, the step number cannot be equally allotted to each of 21 symbols and 400 steps are allotted such as {19 steps×20 symbols+20 steps×1 (one) symbol}. And according to the relation of the vibration frequency T, 1 (one) step corresponds to 1 (one) interruption number.

Accordingly, the maximum interruption number in general becomes 100 {=1 (interruption number necessary for detecting the stop buttons 4)+18 (the maximum waiting time=19 steps −1)+4 (the maximum slide symbol number)× 19 (steps)+5 (interruption number necessary for adjusting the position of the reel 3)=100}.

As mentioned, the maximum time till the stop treatment is completed after the stop buttons 4 are pressed becomes about 187.73 ms {100 (interruptions)×1.875 ms (interruption time interval)=about 187.73 ms}. According to this, the "stop treatment" conducted by the main CPU 40 is done within about 190 ms, as shown in FIGS. 9A AND 9B. After the "stop treatment" is completed, the main CPU 40 conducts the stop control by all-phase excitation (all phases are switched ON) for about 375 ms {200 (interruptions)×1.875 ms}.

Here, as the braking time Δt of the stepping motor 70, the braking time Δt needs for about 100 ms in actual measurement, as shown in FIGS. 9A AND 9B. And since all-phase excitation equals to the non-excitation state, only the detent torque of the stepping motor 70 acts for load torque during the above braking process.

Therefore, supposed that the braking time Δt represents the time necessary for the stepping motor 70 to stop at the prediction position after the stop treatment is completed and the moment of inertia J represents the movement quantity occurring in the rotation shaft of the reel 3, the detent torque Td becomes J·ω/Δt. Thus, the braking time Δt becomes J·ω/Td.

In the conventional mechanism in which the "general reel stop treatment" is done, the rotation shaft of the stepping motor 70 is directly connected to the center of the reel 3 and the "speed reduction treatment" and the "vibration restraining treatment" in the embodiment are not done as shown in FIG. 8. Therefore, the braking time Δt becomes longer than that in the "first reel stop treatment", the "second reel stop treatment" and the "third reel stop treatment" in the embodiment. The "first reel stop treatment", the "second reel stop treatment" and the "third reel stop treatment" will be described hereinafter.

② First Reel Stop Treatment

Figure 10A:
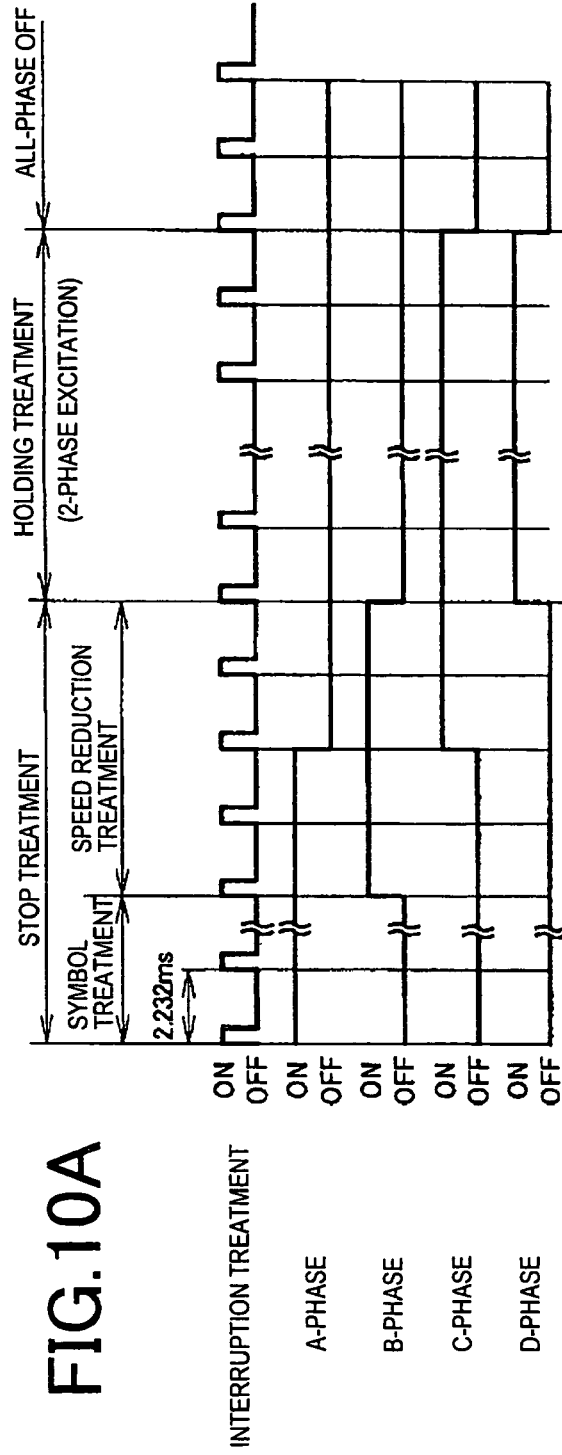
FIGS. 10A and 10B are explanatory views showing contents of "first reel stop treatment", in the embodiment.
Figure 10B:
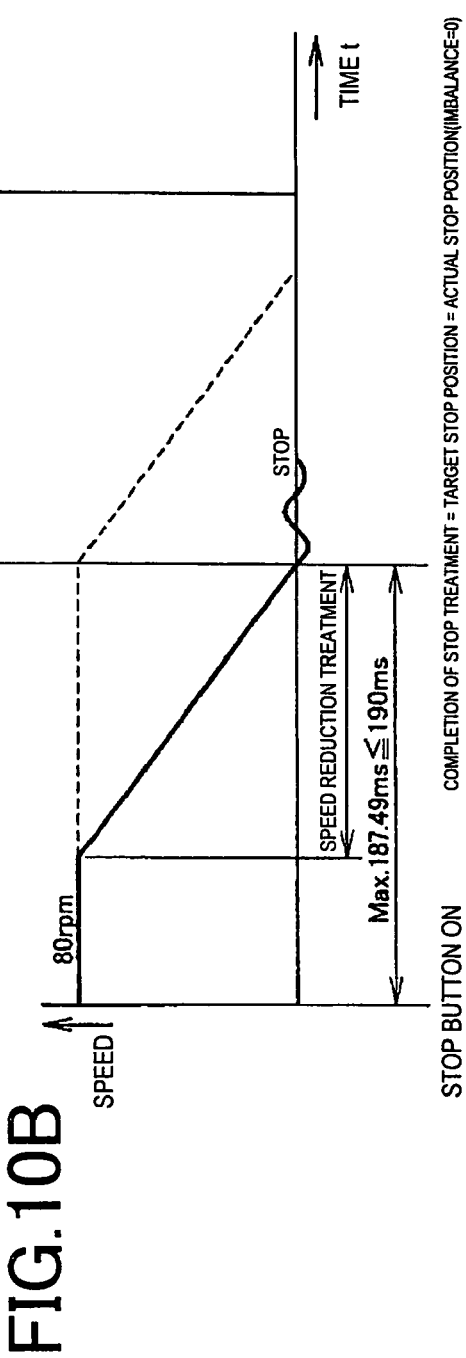

FIG. 10 is an explanatory view indicating contents of the "first reel stop treatment". FIG. 10A is an explanatory view indicating pulses in each phase, the pulses being transmitted from the main CPU 40 to the motor drive circuit 20 during the "stop treatment" and the "holding treatment". FIG. 10B is an explanatory view indicating the rotation speed of the reel 3 against time when the motor drive circuit 20 drives the stepping motor 70 based on the pulses in each phase received from the main CPU 40.

In the embodiment, the time shown in FIG. 10B corresponds to the time shown in FIG. 10A. The dot-line shown in FIG. 10A indicates the rotation speed of the reel in FIG. 9B. And the "completion of stop treatment" shown in FIG. 10B substantially coincides with the "target stop position"

and the "actual stop position" shown in FIG. 9B. And the "completion of stop treatment" shown in FIG. 11B and FIG. 12B is similar to the above.

In the "first reel stop treatment" of the embodiment, when stop instruction command occurs based on an external operation, the main CPU 40 conducts speed reduction control of the stepping motor 70 which rotates at the constant rotation speed so that the rotation speed becomes slower than the constant rotation speed, thereafter the main CPU 40 conducts stop control of the stepping motor 70 by 2-phase excitation.

Concretely, in the "first reel stop treatment", as shown in FIGS. 10A and 10B, the main CPU 40 conducts the "symbol treatment" after the stop buttons 4 are pressed, and conducts the "speed reduction treatment", thereafter conducts the "excitation treatment" by 2-phase excitation, thus the reel 3 is stopped. This "first reel stop treatment" includes the "speed reduction treatment" and the "excitation treatment (2-phase excitation)" which are not included in the "general reel stop treatment", as shown in FIG. 8.

As shown in FIG. 10A, the interruption treatment in the embodiment is conducted, for example, for the time interval of 2.232 ms, different from the case in the "general reel stop treatment". Here, as mentioned, the time interval of the interruption treatment can be determined according to the relation of the drive frequency of the stepping motor 70. The drive frequency S of the stepping motor 70 when rotating at the constant rotation speed can be represented by the relation that S=(rotation number that the reel 3 rotates for one second)×(step number of the stepping motor 70 per one rotation).

If the above (rotation number that the reel 3 rotates for one second) is, for example, 80 rpm/60 sec×7 (speed reduction ratio), the (step number of the stepping motor 70 per one rotation) is, for example, 48, 2-phase excitation as the excitation manner is adopted and the speed reduction ratio is 1:7, the drive frequency S of the stepping motor 70 becomes 448 pps.

Therefore, the vibration frequency T is 1/S, as a result, becomes 2.232 ms. This vibration frequency T (2.232 ms) is a value (vibration frequency T>clock frequency) near the minimum clock frequency (for example, 1.2 ms) utilized in the main CPU 40, thus the interruption treatment is done by the time interval of 2.232 ms. And in the "second reel stop treatment" and the "third reel stop treatment" mentioned hereinafter, the interruption treatment is done by the similar time interval In the "first reel stop treatment, as shown in FIG. 10B, the "speed reduction treatment" is done during the time (about 190 ms) till the stop treatment is completed after the stop buttons 4 are pressed. In the "speed reduction treatment", the main CPU 40 transmits instruction commands to reduce the constant rotation speed of the reel 3 (for example 80 rpm) to the predetermined rotation speed (for example, 40 rpm), to the motor drive circuit 20 for the time corresponding to the predetermined interruption number.

Concretely, as shown in FIG. 10, the main CPU 40 transmits the pulses for 2-phase excitation (speed reduction drive pulses) existing for the predetermined time, as the instruction commands to reduce the constant rotation speed of the reel 3 (for example, 80 rpm) to the predetermined rotation speed (for example, 40 rpm). The motor drive circuit 20 receiving the above pulses for 2-phase excitation excites, for example, B-phase and C-phase based on the received pulses, and reduces the rotation speed of the rotor to the rotation speed of 40 rpm.

When the "speed reduction treatment" is completed, the main CPU 40 conducts the stop control (excitation treatment) by 2-phase excitation. In the "excitation treatment" by 2-phase excitation, as shown in FIG. 10A, the main CPU 40 transmits the pulses (stop drive pulses) to excite, for example, C-phase and D-phase to the motor drive circuit 20 after the "speed reduction treatment" is finished. The motor drive circuit 20 excites, for example, C-phase and D-phase for the predetermined time based on the received pulses. Based on that this "excitation treatment" is continued for the predetermined time, the stepping motor 70 completely stops.

Here, since the speed reduction mechanism 700 has the speed reduction ratio 1: n (for example, n=7) the moment of inertia J' occurring when the reel 3 is rotating becomes the value (J/n) which is obtained by dividing the moment of inertia J occurring without the speed reduction mechanism 700 by the speed reduction ratio n.

Thus, the detent torque Td1 in the "first reel stop treatment" becomes 1/n of the detent torque Td in the "general reel stop treatment" $\{Td1=Td/n=(J/n)\cdot\omega/Td1\}$.

Here, as mentioned later, not only the detent torque Td2 in the "second reel stop treatment" and the detent torque Td3 in the "third reel stop treatment" but also the braking time Δt2 in the "second reel stop treatment" and the braking time Δt3 in the "third reel stop treatment", are reduced according to the relation similar to the above relation of the detent torque Td1 and the braking time Δt1.

Therefore, the "first reel stop treatment", the "second reel stop treatment" and the "third reel stop treatment" can reduce not only the detent torque but also the braking time in the "general reel stop treatment".

③ Second Reel Stop Treatment

FIG. 11 is an explanatory view indicating contents of the "second reel stop treatment". FIG. 11A is an explanatory view indicating pulses in each phase, the pulses being transmitted from the main CPU 40 to the motor drive circuit 20 during the "stop treatment" and the "holding treatment". FIG. 11B is an explanatory view indicating the rotation speed of the reel 3 against time when the motor drive circuit 20 drives the stepping motor 70 based on the pulses in each phase received from the main CPU 40. In the embodiment, the time shown in FIG. 11B corresponds to the time shown in FIG. 10A. The dot-line shown in FIG. 11B indicates the rotation speed of the reel in FIG. 9B.

In the "second reel stop treatment", when stop instruction command occurs based on an external operation, the main CPU 40 conducts the stop treatment against the stepping motor 70 by 2-phase excitation (for example, excitation of C-phase and D-phase) and the vibration restraining member 75 declines the vibration of the reel 3 occurring when rotation of the reel 3 is stopped.

Concretely, in the "second reel stop treatment", as shown in FIGS. 11A and 11B, the main CPU 40 conducts the "symbol treatment" after the stop buttons 4 are pressed, and conducts the "excitation treatment" by 2-phase excitation", thereafter the "vibration restraining treatment by the vibration restraining member 75" is done, thus the reel 3 is stopped. This "second reel stop treatment" includes the "vibration restraining treatment by the vibration restraining member 75" and the "excitation treatment (2-phase excitation)" which are not included in the "general reel stop treatment", as shown in FIG. 8.

Further, although the "second reel stop treatment" does not include "speed reduction treatment" in the "first reel stop treatment" as shown in FIG. 8, the "vibration restraining treatment by the vibration restraining member 75" acts therein. In this "vibration restraining treatment by the vibration restraining member 75", he vibration restraining member 75 declines vibration of the reel 3 occurring when rotation of the reel 3 is stopped.

Thereby, the braking time Δt2 of the reel 3 and the detent torque Td2 in the "second reel stop treatment" can be reduced in comparison with the braking time Δt and the detent torque Td in the "general reel stop treatment", similar to the braking time Δt1 and the detent torque Td1 in the "first reel stop treatment".

④ Third Reel Stop Treatment

Figure 12A:
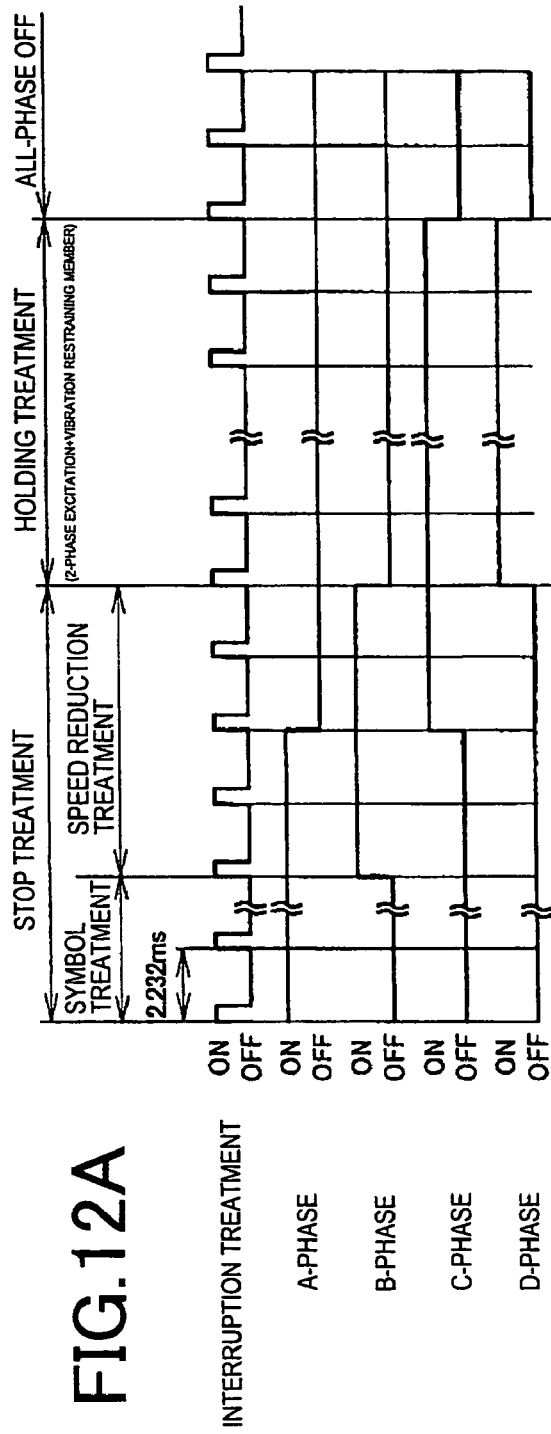
FIGS. 12A and 12B are explanatory views showing contents of "third reel stop treatment", in the embodiment.
Figure 12B:
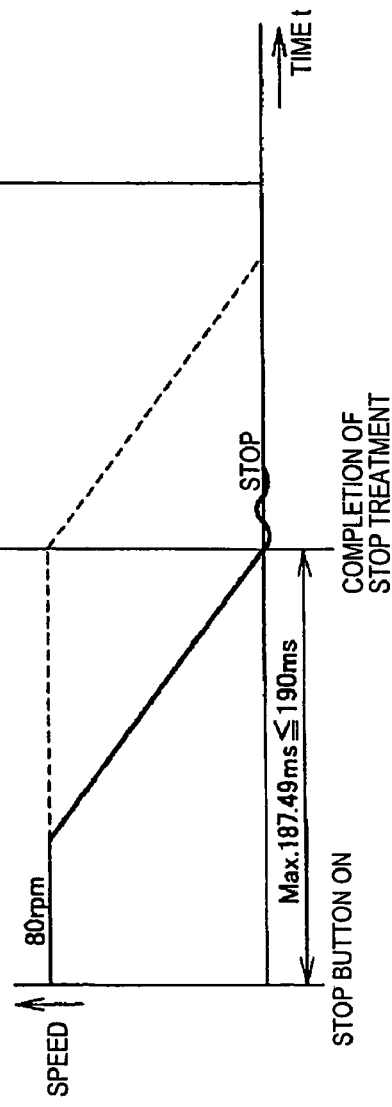

FIG. 12 is an explanatory view indicating contents of the "third reel stop treatment". FIG. 12A is an explanatory view indicating pulses in each phase, the pulses being transmitted from the main CPU 40 to the motor drive circuit 20 during the "stop treatment" and the "holding treatment". FIG. 12B is an explanatory view indicating the rotation speed of the reel 3 against time when the motor drive circuit 20 drives the stepping motor 70 based on the pulses in each phase received from the main CPU 40. In the embodiment, the time shown in FIG. 12B corresponds to the time shown in FIG. 12A. The dot-line shown in FIG. 12B indicates the rotation speed of the reel in FIG. 9B.

In the "third reel stop treatment", when stop instruction command occurs based on an external operation, the main CPU 40 conducts speed reduction control of the stepping motor 70 which rotates at the constant rotation speed so that the rotation speed becomes slower than the constant rotation speed, thereafter the main CPU 40 conducts stop control of the stepping motor 70 by 2-phase excitation (for example, excitation of C-phase and D-phase) and further the vibration restraining member 75 declines vibration of the reel 3 occurring when rotation of the reel 3 is stopped.

Concretely, in the "third reel stop treatment", as shown in FIGS. 12A and 12B, the main CPU 40 conducts the "symbol treatment" after the stop buttons 4 are pressed, and conducts the "speed reduction treatment", thereafter conducts the "excitation treatment" by 2-phase excitation, and further the "vibration restraining treatment by the vibration restraining member 75" acts, thus the reel 3 is stopped.

This "third reel stop treatment" includes the "vibration restraining treatment" not included in the "general reel stop treatment" and both the "speed reduction treatment" and the "excitation treatment" by 2-phase excitation which are not included in the "general reel stop treatment". Here, since each of the treatments is explained in the above, description thereof will be omitted.

Thereby, the braking time Δt3 of the reel 3 and the detent torque Td3 in the "third reel stop treatment" can be reduced in comparison with the braking time Δt and the detent torque Td in the "general reel stop treatment", similar to the braking time Δt1 and the detent torque Td1 in the "first reel stop treatment".

⑤ Wave Form Actually Measured

FIG. 13A is an explanatory view indicating the rotation speed of the reel 3 against time when the above "general reel stop treatment" (see FIG. 8) is conducted. FIG. 13B is an explanatory view indicating the wave form actually measured, the wave form showing the rotation speed of the reel 3 against time when only the "excitation treatment by 2-phase excitation" is done, although the above wave form does not indicate the wave form actually measured in the "first reel stop treatment" to the "third reel stop treatment". FIGS. 13C to 13E indicates the wave form actually measured, the wave form showing the rotation speed of the reel 3 against time when the "first reel stop treatment" is conducted.

Here, "448 pps→speed reduction treatment (224 pps.x.2 pulses)→holding treatment" shown in FIG. 13C means that the "symbol treatment" with interruption treatment of 2.232 ms time interval (period of the drive frequency with 448 pps) is conducted and the "speed reduction treatment" with interruption treatment of 2.232 ms.times.4 (twice of the drive frequency with 224 pps) is conducted and thereafter the "holding treatment" is conducted. Similarly, flow indicated by arrows in FIGS. 13D and 13E indicates the same contents shown in FIG. 13C.

Comparing the wave form actually measured in the "general reel stop treatment" shown in FIG. 13A with the wave form actually measured in the "excitation treatment by 2-phase excitation" shown in FIG. 13B, the braking time Δt1 (time till the reel 3 rotates at the target stop position after the excitation treatment is done: such time is similarly used hereinafter) shown in FIG. 13B is clearly shorter in comparison with the Δt 0 shown in FIG. 13B. Similarly, comparing the wave form actually measured in the "general reel stop treatment" shown in FIG. 13A with the wave form actually measured in the "first reel stop treatment" shown in FIGS. 13C to 13E, the braking time Δt21, Δt22, Δt23 shown in FIGS. 13C to 13E are clearly shorter in comparison with the Δt 0 shown in FIG. 13A. Thereby, the "excitation treatment by 2-phase excitation" in the embodiment can clearly shorten the braking time in comparison with the "excitation treatment by all-phase excitation" in the "general reel stop treatment".

And comparing the wave form actually measured in only the "excitation treatment by 2-phase excitation" shown in FIG. 13B with the wave form actually measured in the "first reel stop treatment" shown in FIGS. 13C to 13E, the amplitude of the reel 3 shown in FIGS. 13C to 13E is smaller than the amplitude of the reel 3 shown in FIG. 13B. Thereby, if the "speed reduction treatment" in the embodiment is conducted, the amplitude of the reel 3 can be more effectively declined than the stop treatment in which the "speed reduction treatment" is not done.

Further, comparing each of the wave forms shown in FIGS. 13C to 13E with each other, the amplitude of the reel 3 becomes smaller and smaller, and further declining time of the amplitude of the reel 3 becomes shorter and shorter (about 300 ms→about 210 ms), according that treatment time in the "speed reduction treatment" becomes longer and longer FIG. 13C→FIG. 13D→FIG. 13E). Therefore, if the treatment time in the "speed reduction treatment" is lengthened, the amplitude of the reel 3 can be effectively made small and the declining time of the amplitude of the reel 3 can be shortened.

Figure 14A:
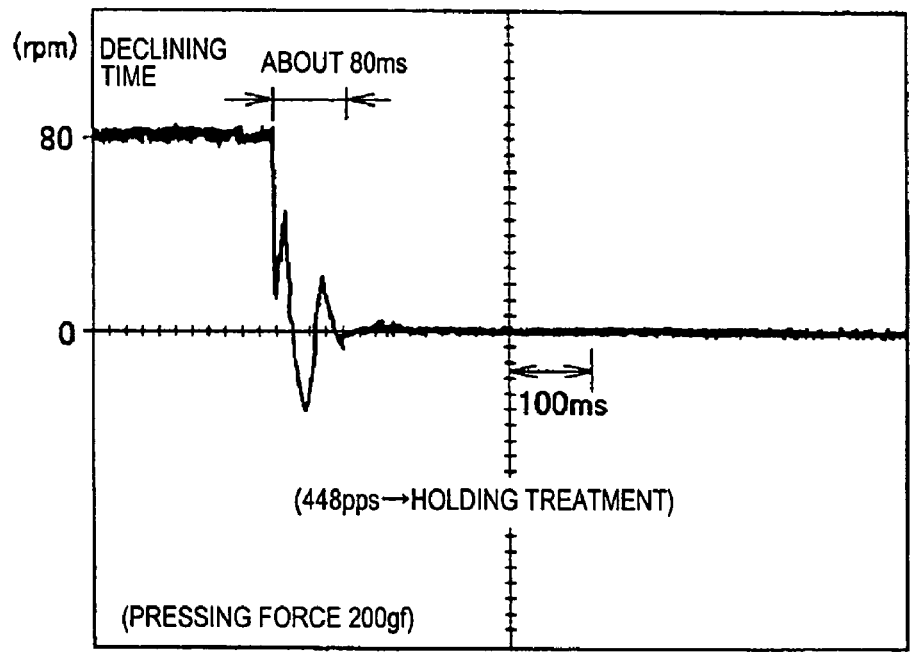
FIGS. 14A and 14B are explanatory views showing wave forms of reel rotation speed measured in the second reel stop treatment and the third reel stop treatment, in the embodiment
Figure 14B:
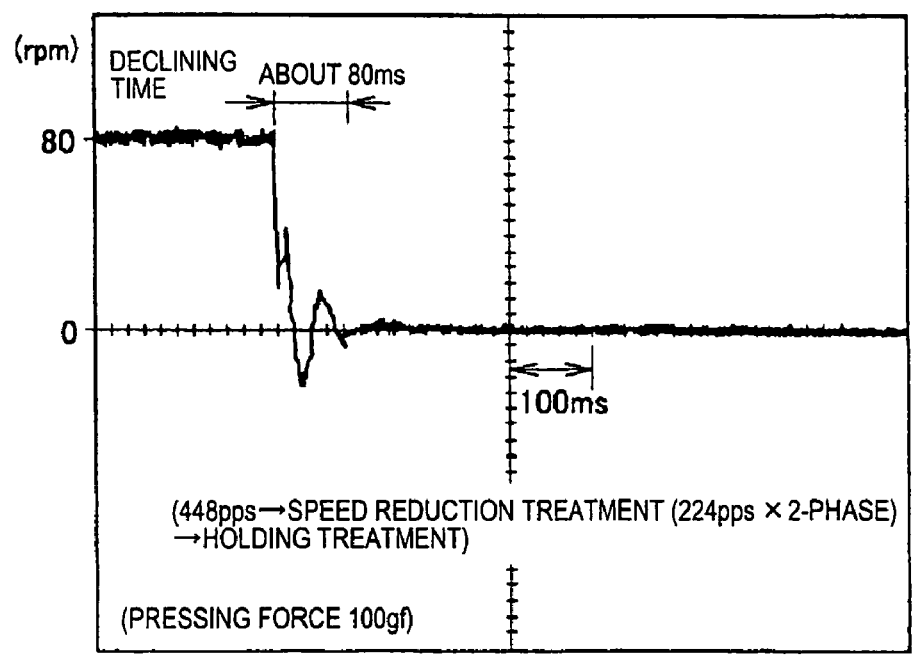

FIGS. 14A and 14B indicate the wave form actually measured, the wave form showing the rotation speed of the reel 3 against time when the "second reel stop treatment" and the "third reel stop treatment" are executed. Pressing force to the reel 3 shown in FIGS. 14A and 14B is 200 gf and 100 gf, respectively. This pressing force to the reel 3 means load given to the reel 3 by the vibration restraining member 75 in the "vibration restraining treatment by the vibration restraining member 75".

And "448 pps→holding treatment" shown in FIG. 14A means that the "symbol treatment" with interruption treatment of 2.232 ms time interval (period of the drive frequency with 448 pps) is conducted, and thereafter "holding treatment" is conducted. And "448 pps→speed reduction treatment (224 pps×2 pulses)→holding treatment" shown in FIG. 14B means that the "symbol treatment" with interruption treatment of 2.232 ms time interval (period of the drive frequency with 448 pps) is conducted and the "speed reduction treatment" with interruption treatment of 2.232 ms×4 (twice of the drive frequency with 224 pps) is conducted and thereafter the "holding treatment" is conducted.

As shown in FIG. 14A, it can be understood that since pressing force (200 gf) to the reel 3 exists the declining time of the amplitude of the reel 3 in the "second reel stop treatment" (448 pps→holding treatment) becomes shorter than the declining time in only "excitation treatment by 2-phase excitation" (448 pps→holding treatment) shown in FIG. 13B, in which pressing force to the reel 3 does not exist. Here, the above relation is clear based on that the declining time in FIG. 14A is about 80 ms and the declining time in FIG. 13B is about 320 ms. Therefore, in the "second reel stop treatment", the declining time can be made shorter than that in only the "excitation treatment by 2-phase excitation" shown in FIG. 13B, even if the peed reduction treatment in the "first reel stop treatment" is not conducted. Thus, vibration of the reel 3 can be more effectively restrained.

And it can be understood that, as shown in FIG. 14B, since pressing force (100 gf) to the reel 3 exists the declining time of the amplitude of the reel 3 in the "third reel stop treatment" (448 pps→speed reduction treatment (224 pps×2 pulses)→holding treatment) is shorter than that in the "first reel stop treatment" (448 pps→speed reduction treatment (224 pps×2 pulses) holding treatment), in which the same speed reduction treatment is done and pressing force to the reel 3 does not exist. Here, the above relation is clear based on that the declining time in FIG. 14A is about 80 ms and the declining time in FIG. 13C is about 300 ms. Therefore, since treatment time in the speed reduction treatment of the "third reel stop treatment" is short, the declining time can be made shorter than that of the "first reel stop treatment" shown in FIG. 13C, in which the declining time cannot be efficiently shortened, as a result, vibration of the reel 3 can be more effectively restrained.

Further, since the "third reel stop treatment" shown in FIG. 14B has treatment contents that the "speed reduction treatment" is added to the "second reel stop treatment" as shown in FIG. 8, the declining time can be shortened to the same extent in the case of FIG. 14A, even if pressing force of the reel 3 is weaker than that in the "second reel stop treatment" shown in FIG. 14A.

(Reel Stop Control Method in Motor Stop Control Device)

Figure 15:
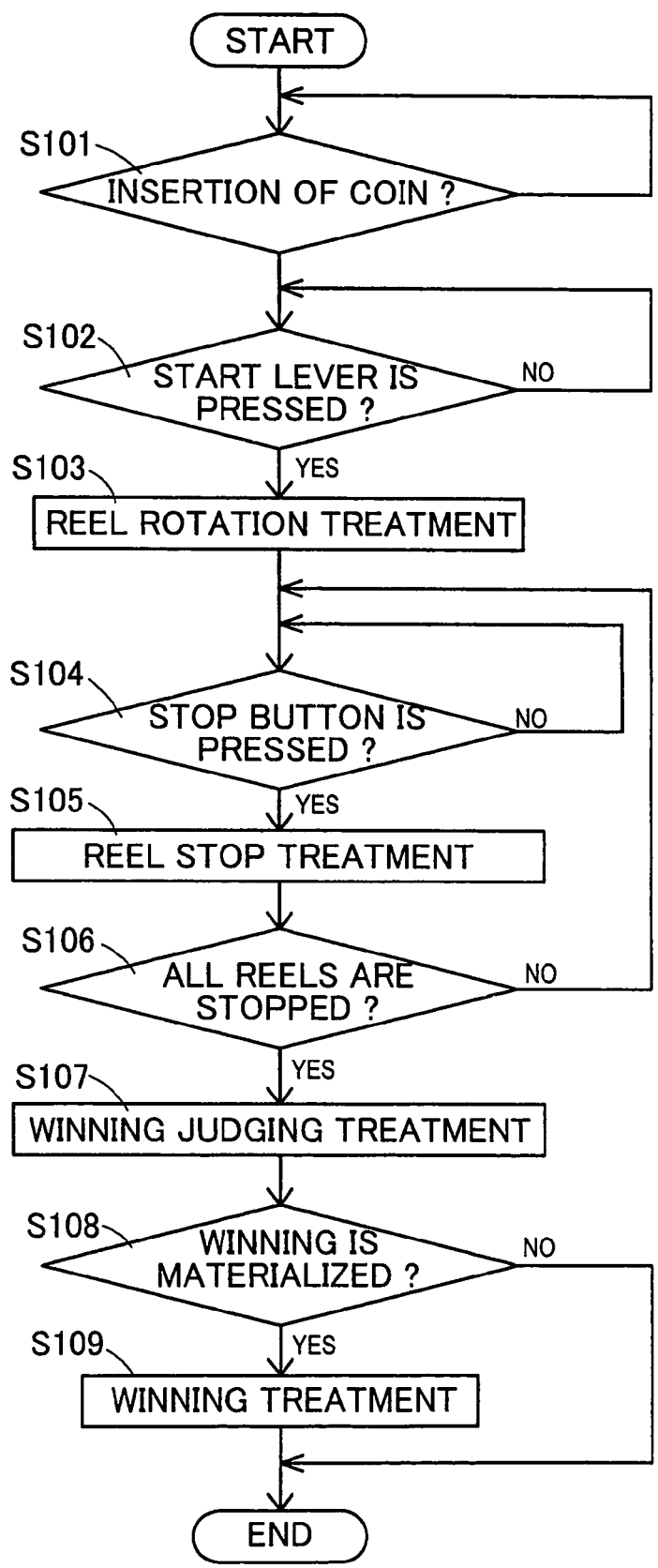
FIG. 15 is a flowchart showing procedures of the reel stop control method, in the embodiment.

The reel stop control method in the above constructed motor stop control device can be executed according to procedures mentioned hereinafter. FIG. 15 is a flowchart showing procedures of the reel stop control method in the motor stop control device.

As shown in FIG. 15, when the player inserts coins in the insertion slot 7 or the BET switch 2 is pressed, judgement in S101 becomes "YES" and the main CPU 40 observes whether the start lever 9 is operated or not (S102). And if the player operates the start lever 9, the main CPU 40 executes rotation treatment to rotate three stepping motors 70 at the same time (S103).

Further, if the player presses any one of the stop buttons 4, judgement in S104 becomes "YES" and the main CPU 40 executes reel stop treatment according to procedures shown in FIG. 16 (S105) And when all of the three reels 3 stop, the main CPU 40 executes winning judging treatment (S106, S107).

Thereafter, when judged that winning is materialized, judgement in S108 becomes "YES" and the main CPU 40 executes winning treatment (for example, effect control for displaying the predetermined images on the display, or lamp turning on treatment for serially turning on lamps in the predetermined order) in S109. On the other hand, when judged that winning is not materialized, judgement in S108 becomes "NO" and the main CPU 40 finishes procedures without executing winning treatment in S109.

Figure 16A:
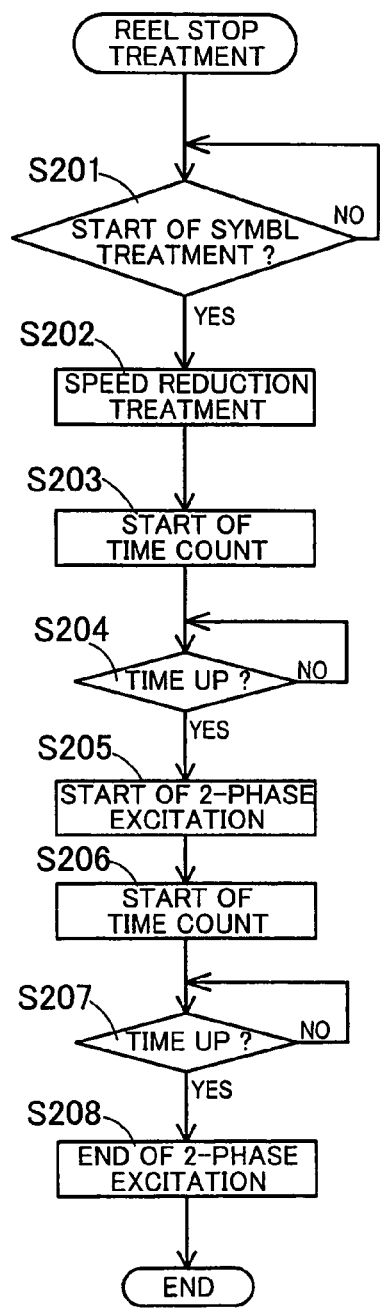
FIGS. 16A, 16B, and 16C are flowcharts showing procedures of the reel stop treatments, in the embodiment.

FIG. 16 illustrates flowcharts showing procedures in S105 shown in FIG. 15. FIG. 16A is a flowchart showing procedures in the "first reel stop treatment". Here, 2-phase excitation is adopted in the "excitation treatment".

As shown in FIG. 16A, the main CPU 40 waits till the "symbol treatment" is started in S201. When the player operates the stop buttons 4, after it is conducted the symbol draw-in treatment that the predetermined symbols internally won are drawn in the pay line (or if the symbol draw-in treatment is not done, according to pressing operation of the stop buttons 4 by the player), the main CPU 40 conducts the speed reduction treatment in which rotation speed (for example, 80 rpm) of the reel rotating at the constant rotation speed is reduced to the slower rotation speed (for example, 40 rpm) in S202. In this speed reduction treatment, the main CPU 40 outputs to the motor drive circuit 20 pulses by which rotation speed of the stepping motor 70 is made slower than the constant rotation speed.

At that time, the main CPU 40 counts the continuation time of the speed reduction treatment (S203). And when the predetermined time is elapsed, judgement in S204 becomes "YES" and the main CPU 40 finishes the speed reduction treatment. Further, the main CPU 40 conducts the excitation treatment (stop control) by 2-phase excitation (for example, excitation of C-phase and D-phase) in S205.

And the main CPU 40 counts the continuation time of the excitation treatment by 2-phase excitation (S206), and when the predetermined time is elapsed, judgement in S207 becomes "YES". The main CPU 40 finishes the excitation treatment by 2-phase excitation (stop control) through the motor drive circuit 20 (S208).

Figure 16B:
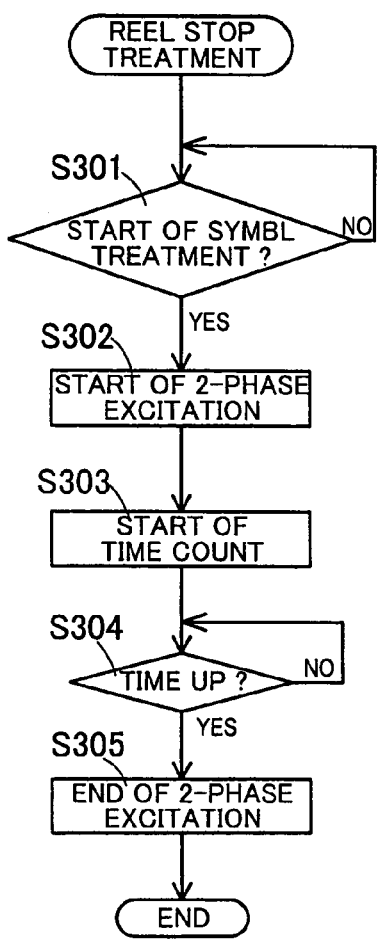

FIG. 16B is a flowchart showing procedures in the "second reel stop treatment". As shown in FIG. 16B, the main CPU 40 waits till the "symbol treatment" is started in S301. When the player operates the stop buttons 4, after it is conducted the symbol draw-in treatment that the predetermined symbols internally won are drawn in the pay line (or if the symbol draw-in treatment is not done, according to pressing operation of the stop buttons 4 by the player), the main CPU 40 conducts the excitation treatment (stop control) by 2-phase excitation (for example, excitation of C-phase and D-phase) through the motor drive circuit 20 in S302. During the excitation treatment by 2-phase excitation is executed, the vibration restraining treatment by the vibration restraining member 75 is conducted with the above excitation treatment.

And the main CPU 40 counts the continuation time of the excitation treatment by 2-phase excitation (S303), and when the predetermined time is elapsed, judgement in S304 becomes "YES". The main CPU 40 finishes the excitation treatment by 2-phase excitation (stop control) through the motor drive circuit 20 (S305). Here, the vibration restraining treatment by the vibration restraining member 75 is finished at the same time when the reel 3 is stopped, because such treatment corresponds to mechanical braking mechanism.

Figure 16C:
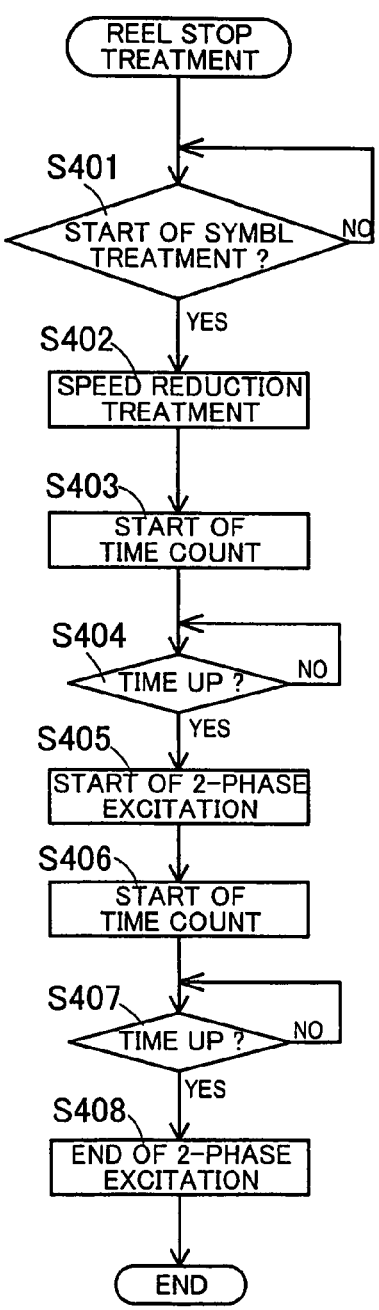

FIG. 16C is a flowchart showing procedures in the "third reel stop treatment". In the "third reel stop treatment, the vibration restraining treatment by the vibration restraining member 75 is conducted with the "first reel stop treatment" shown in FIG. 16A. Therefore, the procedures in the "third reel stop treatment" is as same as those in the "first reel stop treatment", thus explanation of the "third reel stop treatment" will be omitted.

(Action and Effect by Motor Stop Control Device)

According to the above constructed device, the speed reduction transmission mechanism 700 transmits rotation of the stepping motor 70 to the rotation shaft of the reel 3 with the predetermined speed reduction ratio, therefore a designer of the device can adopt the stepping motor which has small rotation torque and is very inexpensive.

Further, since the main CPU 40 executes the speed reduction treatment to reduce rotation speed of the stepping motor 70 and thereafter executes the stop control by 2-phase excitation against the stepping motor 70, the main CPU 40 can precisely stop the reel 3 at the exact position. Further, since the main CPU 40 can conduct the stop control by only 2-phase excitation against the stepping motor 70, the main CPU 40 can precisely stop the reel at a more exact position.

Further, since the main CPU 40 executes the speed reduction treatment to reduce rotation speed of the stepping motor 70, the main CPU 40 can stop the reel 3 at the exact position while retaining smoothness in braking of the stepping motor 70, in comparison with the case that rotation speed of the stepping motor 70 is rapidly reduced. As a result, since braking control does not depend on the detent torque occurring when the reel 3 is stopped, the above mentioned balance adjustment is not needed when the motor stop control device is produced and the assembler can assemble the reel unit with less manday.

Further, since the vibration restraining member 75 always urges the reel 3, vibration of the reel 3 occurring when the reel 3 is stopped can be declined by the vibration restraining member 75. As a result, the reel 3 can be stopped at the exact position without losing smoothness in braking of the stepping motor 70. And since the vibration restraining member 75 is provided, the above balance adjustment is not needed when the motor stop control device is produced and the assembler can assemble the reel unit with less manday.

(First Modification)

Figure 17A:
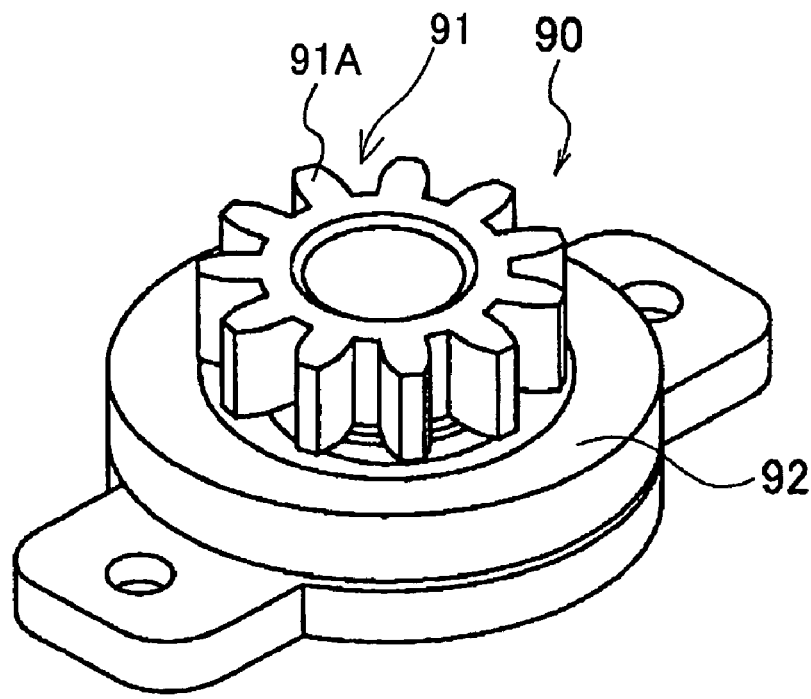
FIGS. 17A and 17B are explanatory views of an oil damper in a first modification.
Figure 17B:
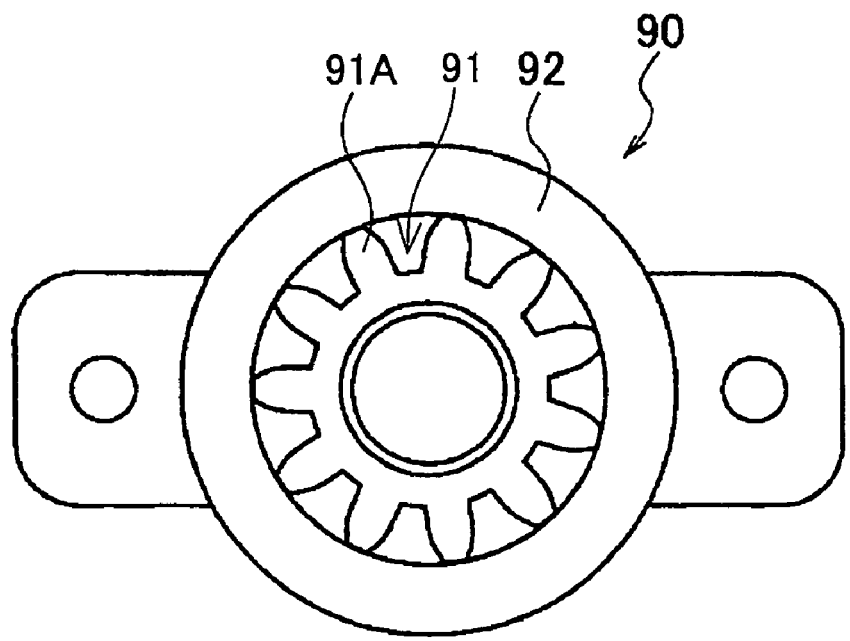

The present invention is not limited to the above mentioned embodiment, and modifications can be added as follows. In the first modification, an oil damper is utilized instead of the vibration restraining member 75. FIGS. 17A and 17B are perspective views of the oil damper 90 according to the first modification.

The oil damper 90 has a rotation part 91 and a base part 92, as shown in FIGS. 17A and 17B. In the base part 92, oil with predetermined viscosity is filled. Since oil is filled in the base part 92, rotation of the rotation part 91 is damped.

Figure 18:
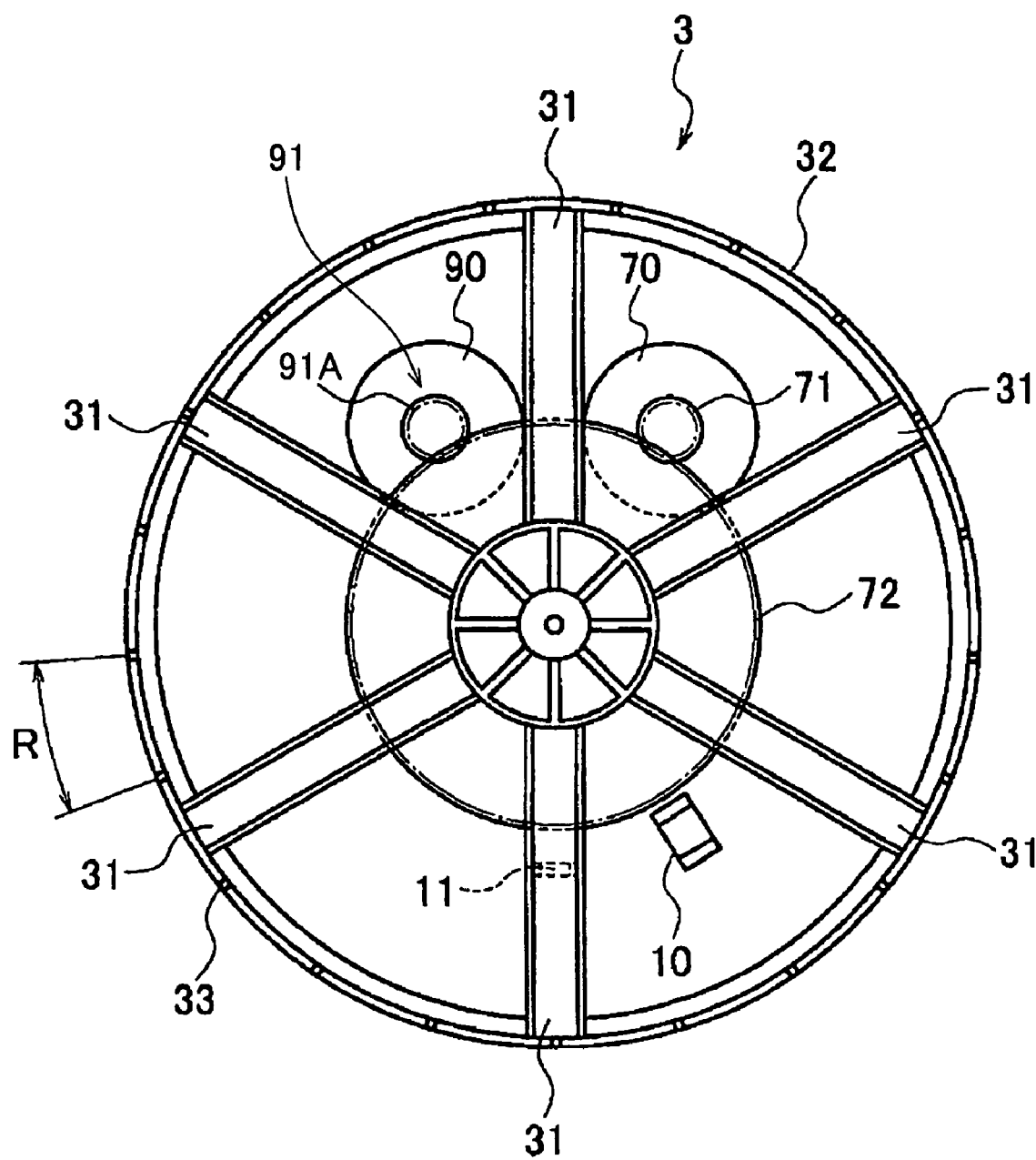
FIG. 18 is an explanatory view showing a positional relation of the oil damper in the first modification.

FIG. 18 is an explanatory view showing a positional relation of the oil damper in the first modification. In the oil damper 90, as shown in FIG. 18, gear teeth 91A formed in the rotation part 91 is arranged within the reel 3 so as to mesh with the input gear 72.

According to the above first modification, rotation force of the rotation part 91 is damped by oil filled in the base part 92 (damping force). Since the gear teeth 91A formed in the rotation part 91 meshes with the input gear 72, the oil damper 90 has braking function acting when the reel 3 is stopped, based on damping force occurring in the rotation part 91 within the base part 92 in which oil is filled. And the oil damper 90 can rapidly decline vibration of the reel 3, the vibration occurring when the stepping motor 70 is braked (or when backlash occurs)

(Second Modification)

The present invention is not limited to the above mentioned embodiment, and modifications can be added as follows. In the second modification, a felt 751, a high frictional member such rubber and the like or a wave washer 752 is utilized instead of the vibration restraining member 75.

Figure 19A:
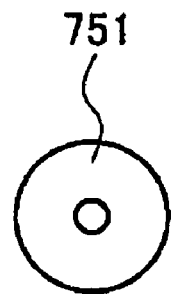
FIG. 19 is an explanatory view showing a construction and a positional relation of a felt in a second modification.
Figure 19B:
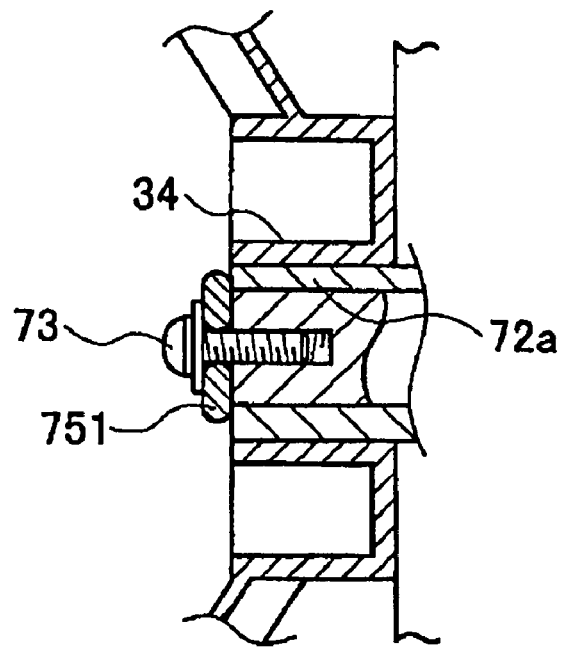

FIG. 19A is a plan view of the felt 751. FIG. 19B is an explanatory view indicating a positional relation when the felt 751 is arranged. As shown in FIGS. 19A and 19B, the felt 751 is formed in a circular shape and a hole to insert the stopper screw 73 is formed at the center thereof. The felt 751 is fixed by the stopper screw 73 so as not to come off.

Figure 20A:
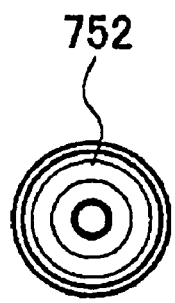
FIG. 20 is an explanatory view showing a construction and a positional relation of a wave washer in the second modification.
Figure 20B:
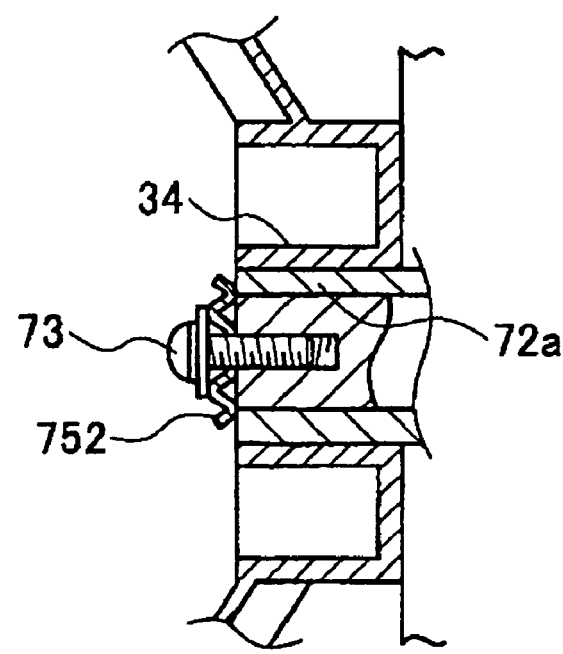

FIG. 20A is a plan view of the wave washer 752. FIG. 20B is an explanatory view indicating a positional relation when the wave washer 752 is arranged. As shown in FIGS. 20A and 20B, the wave washer 752 is formed so as to have a wave-like plane shape from the center toward the outside and a hole to insert the stopper screw 73 is formed at the center thereof. The wave washer 752 is fixed by the stopper screw 73 so as not to come off.

According to the above construction, the high frictional member including the felt 751 and the wave washer 752 fixed by the stopper screw 73 can decline vibration of the reel 3 occurring when the reel 3 is stopped by frictional force of the high frictional member.

(Third Modification)

The present invention is not limited to the above mentioned embodiment, and modifications can be added as follows. In the third modification, a rubber roller 711 and 721 are utilized instead of the output gear 71 and the input gear 72.

Figure 21:
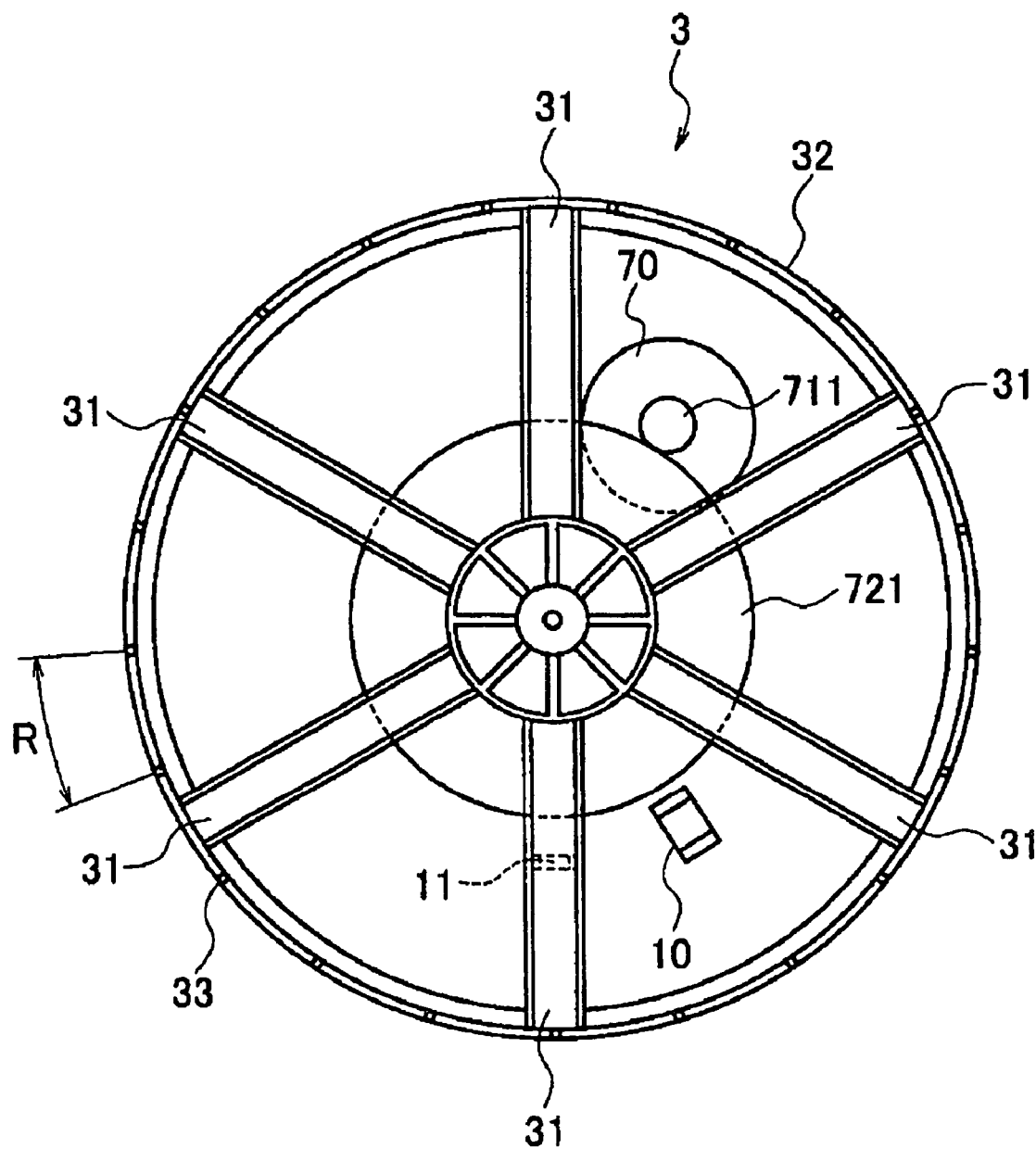
FIG. 21 is an explanatory view showing a positional relation of a rubber roller in a third modification.

FIG. 21 is an explanatory view indicating a positional relation when the rubber rollers 711 and 721 are arranged. These two rubber rollers 711, 721 contact with each other and can mutually transmit rotation because of high frictional coefficient without sliding therebetween. The rubber rollers 711, 721 are arranged inside of the reel 3. Thereby, even if vibration occurs in the rotation shaft of the reel 3 when the stepping motor 70 is braked (or when backlash occurs), the rubber rollers 711, 721 is resiliently deformed, thereby vibration can be absorbed.

Figure 22:
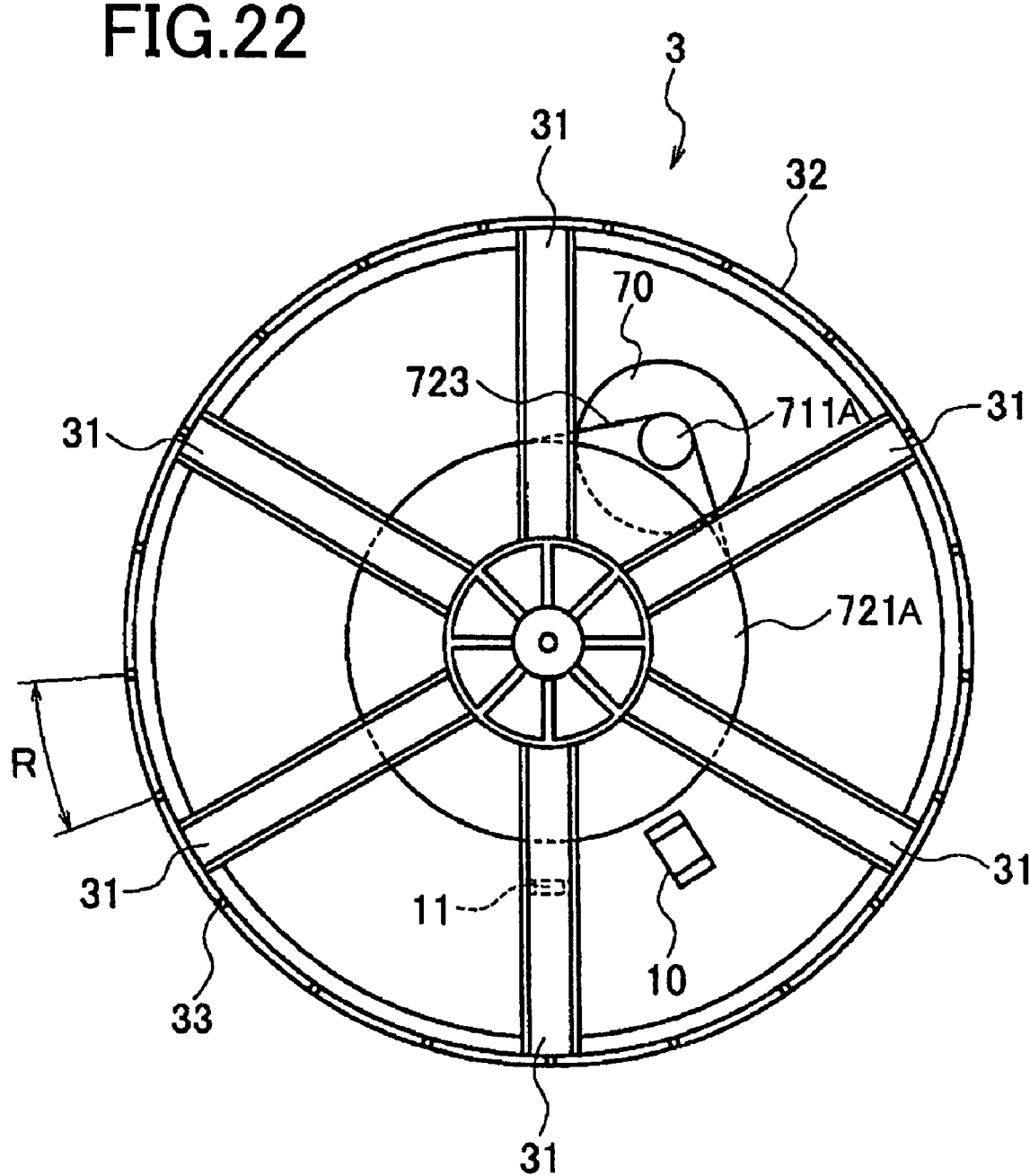
FIG. 22 is an explanatory view showing a positional relation among an output pulley, an input pulley and a belt suspended around the both output and input pulleys, in the third modification.

Here, in the third modification, instead of the output gear 71 and the input gear 72 formed into the spur gear, a flexible belt 723 formed of soft material including rubber or urethane may be suspended around an output pulley 711A and an input pulley 721A. FIG. 22 is an explanatory view indicating a positional relation when the output pulley 711A and the input pulley 721A, both being formed of rubber, and the flexible belt 723 are arranged. The output pulley 711A and the input pulley 721A are rotated according to rotation of the flexible belt 723 suspended around the pulleys 711A, 721A.

Thereby, even if vibration occurs in the rotation shaft of the reel 3 when the stepping motor 70 is braked (or when backlash occurs), the flexible belt 723 can absorb such vibration because the flexible belt 723 extends and shrinks.

Here, in the modifications, one of the output gear 71 and the input gear 72 may be exchanged with a scissors gear. Thereby, backlash between gears can be removed and it can be realized the construction with less vibration. Further, even if vibration occurs in the rotation shaft of the reel 3 when the stepping motor 70 is braked, the output gear or the input gear which is constructed from the scissors gear can absorb such vibration. Here, the spur gear formed of soft material such as polyamide may be utilized. Thereby, since the spur gear made of soft material resiliently deforms, vibration occurring in the rotation shaft of the reel 3 can be absorbed.

In the embodiment, although the speed reduction treatment is added to the stop control of the stepping motor 70 which rotates at the constant rotation speed, the present invention is not limited to the case that the stepping motor 70 rotates at the constant rotation speed. For example, the speed reduction treatment can be also done in a case that rotation speed of the reel 3 changes in a range of 60 rpm to 80 rpm.

In the embodiment, although the stepping motor 70 of PM type is utilized, it is not limited to this. For example, the stepping motor of hybrid type with low torque may be used in the direct drive manner.

What is claimed is:

1. A motor stop control device utilizable for a reel-type gaming machine comprising:
    a motor having two pairs of excitation phases for rotating a reel on an outer periphery of which a plurality of symbols are formed, the motor being stopped corresponding to a motor stop command;
    a speed reduction mechanism for transmitting rotation of the motor to a rotation shaft of the reel with a predetermined speed reduction ratio; and
    a motor stop controller for conducting speed reduction treatment to reduce rotation speed of the motor by exciting no more than two excitation phases included in a first combination and thereafter continuously exciting no more than two excitation phases included in a second combination, wherein one of the two excitation phases is commonly used in the first combination and the second combination and for conducting excitation treatment by 2-phase excitation against the motor when the motor stop command occurs.

2. The motor stop control device according to claim 1, wherein the speed reduction mechanism comprises:
    a first gear fixed on a drive shaft of the motor; and
    a second gear fixed on a rotation shaft of the reel, the second gear meshing with the first gear.

3. The motor stop control device according to claim 2, wherein the motor is constructed from a stepping motor and both the first gear arid the second gear are constructed from spur gears; and
    wherein the speed reduction ratio of the first gear and the second gear is determined by a step number per one rotation of the stepping motor, and the least common multiple calculated based on a number of symbols formed on the reel and the step number of the stepping motor.

4. The motor stop control device according to claim 1, wherein the motor stop controller conducts the speed reduction treatment by transmitting speed reduction drive pulses to the stepping motor for a predetermined time.

5. The motor stop control device according to claim 1, wherein the motor stop controller conducts the excitation treatment by transmitting motor stop drive pulses to the stepping motor for a predetermined time after the speed reduction treatment is finished.

6. The motor stop control device according to claim 1, further comprising:
    a vibration restraining member for suppressing vibration occurring when rotation of the reel is stopped, when the excitation treatment is conducted by the motor stop controller.

7. The motor stop control device according to claim 6, further comprising a reel support plate on which the reel is rotatably supported;
    wherein the vibration restraining member is constructed from a spring which is put on the rotation shaft of the reel and urges the second gear toward the reel support plate.

8. The motor stop control device according to claim 6, further comprising a reel support plate on which the reel is rotatably supported;
    wherein the speed reduction mechanism comprises:
    a first gear fixed on a drive shaft of the motor; and
    a second gear fixed on a rotation shaft of the reel, the second gear meshing with the first gear,
    wherein the vibration restraining member comprises an oil damper including:
    a base part in which oil is filled, the base part being supported on the reel support plate;
    a rotation part having gear teeth meshing with the second gear, the rotation part being rotatably supported in the base part; and
    wherein rotation force of the rotation part is damped by oil in the base part when the rotation part is rotated by the second gear.

9. The motor stop control device according to claim 6, wherein the vibration restraining member comprises a frictional member which is fixed to a top end of the rotation shaft of the reel through a stopper member.

10. The motor stop control device according to claim 9, wherein the frictional member is a felt.

11. The motor stop control device according to claim 9, wherein the frictional member is a wave washer.

* * * * *